United States Patent [19]

Romeo et al.

[11] Patent Number: 5,516,385
[45] Date of Patent: May 14, 1996

[54] METHOD FOR FABRICATING HONEYCOMB INSULATING MATERIAL

[75] Inventors: Frank C. Romeo, Fort Worth; Ronald J. Davis, Euless, both of Tex.; Harlan A. Holmes, Los Angeles, Calif.

[73] Assignee: Newell Operating Co., Freeport, Ill.

[21] Appl. No.: 241,281

[22] Filed: May 11, 1994

Related U.S. Application Data

[62] Division of Ser. No. 839,600, Feb. 21, 1992, Pat. No. 5,334,275.

[51] Int. Cl.⁶ .............................. B32B 31/18; B32B 31/20
[52] U.S. Cl. ........................... 156/200; 156/264; 156/270
[58] Field of Search ................................... 156/260, 264, 156/356, 512, 558, 199, 203, 218, 264, 269, 270, 324; 118/677, 679; 427/256, 208.6

[56] References Cited

U.S. PATENT DOCUMENTS

| | | |
|---|---|---|
| 3,493,450 | 2/1970 | Judge, Jr. . |
| 3,834,290 | 9/1974 | Nelson . |
| 3,866,765 | 2/1975 | Stobb . |
| 4,408,562 | 10/1983 | De Camp et al. ............... 118/677 |
| 4,450,027 | 5/1984 | Colson . |
| 4,527,510 | 7/1985 | Arndt ............................. 118/669 |
| 5,308,435 | 5/1994 | Ruggles et al. ................ 156/465 |

Primary Examiner—Michael W. Ball
Assistant Examiner—Richard Crispino
Attorney, Agent, or Firm—Foley & Lardner

[57] ABSTRACT

Apparatus for mass producing one or more individual stacks of expandable, secured together tubular strips which includes a stacking station having an inlet and a conveyor system for sequentially delivering tubular strips having a flat face sequentially to a point opposite said inlet. The stacking station includes pushing apparatus opposite said inlet for pushing the strip delivered opposite said inlet into said chamber. The pushing apparatus has a strip-holding face lying in a given plane and having suction apertures for holding said flat face of each strip delivered thereto in said plane. The pushing member is moved back and forth into and out of said stacking chamber at said inlet with said strip-holding face presented parallel to the flat face of the previous strip delivered to said stacking chamber to push the opposite side of the strip against the flat face of the adjacent strip in said chamber to secure the strips together and form a substantially unwrinkled stack of aligned strips.

2 Claims, 22 Drawing Sheets

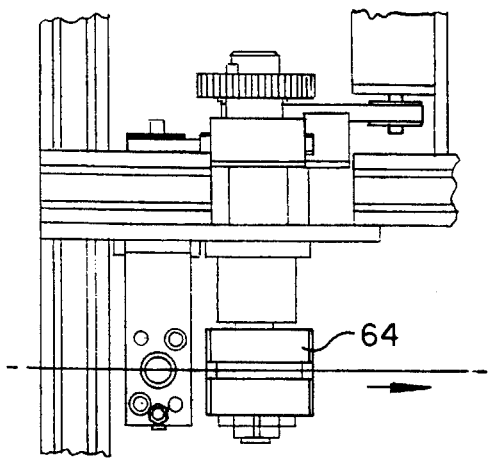
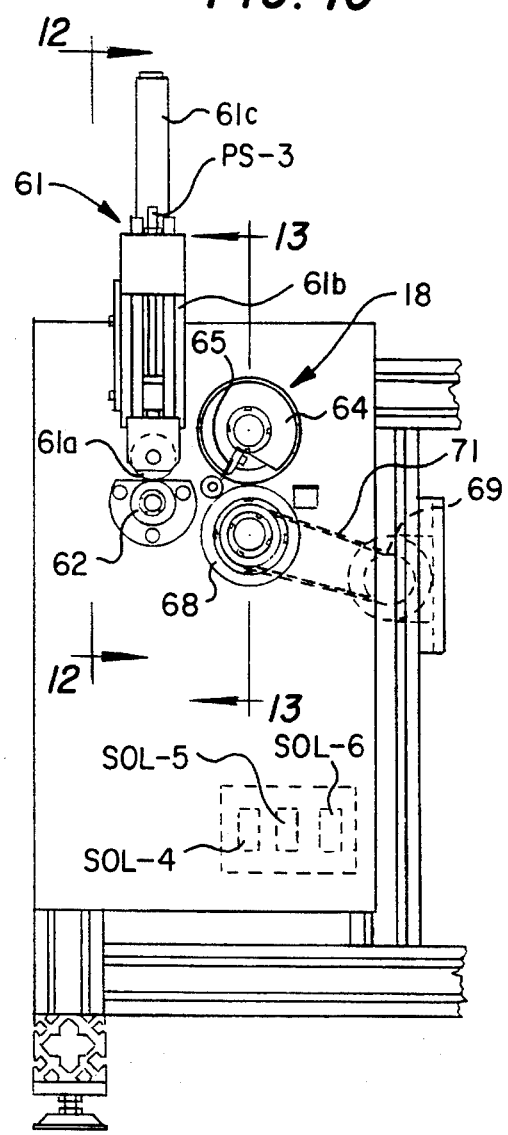
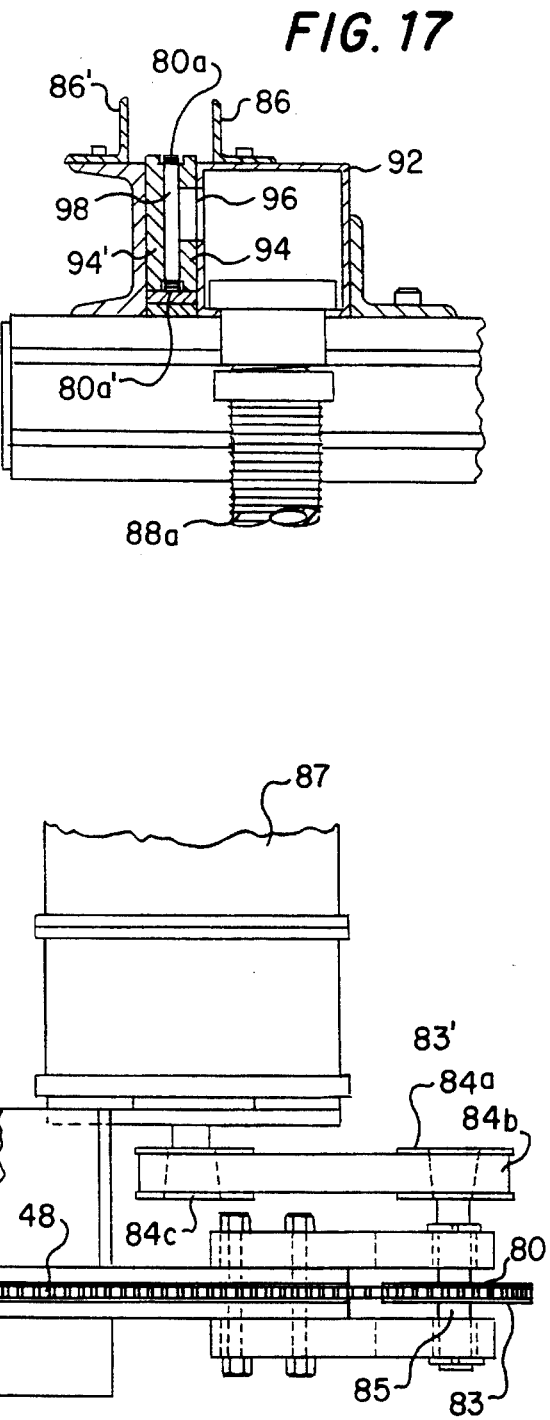
FIG. 10
FIG. 17
FIG. 11
FIG. 18

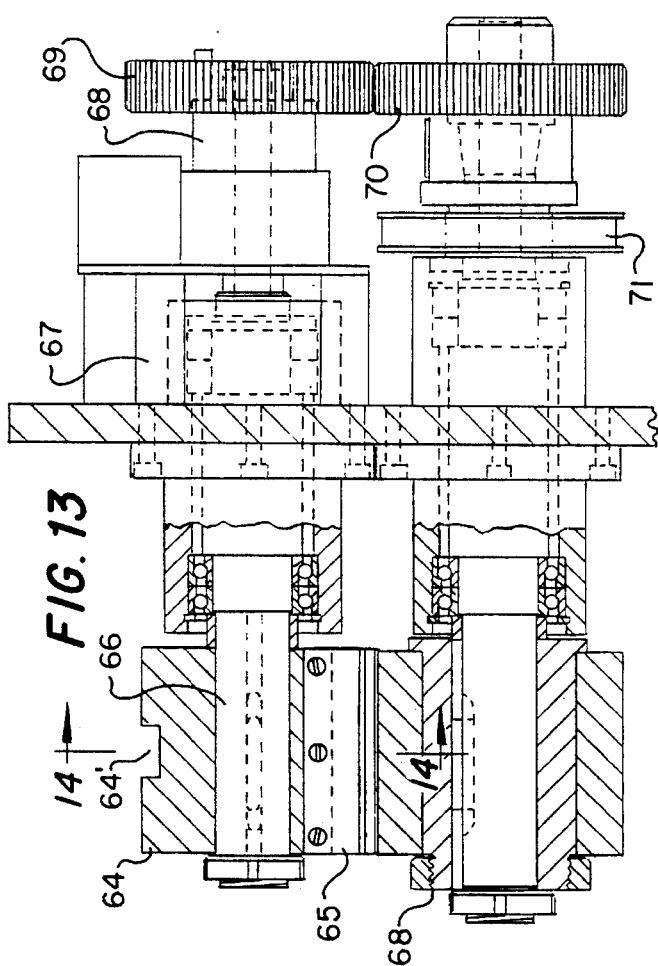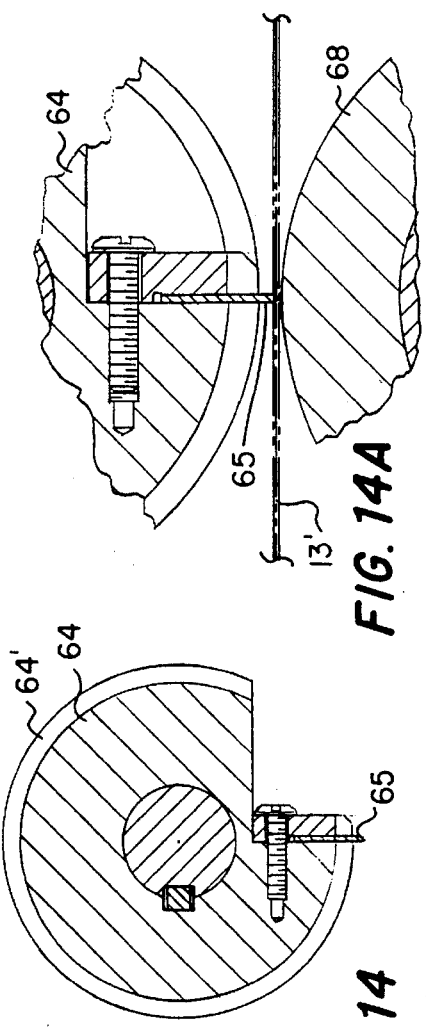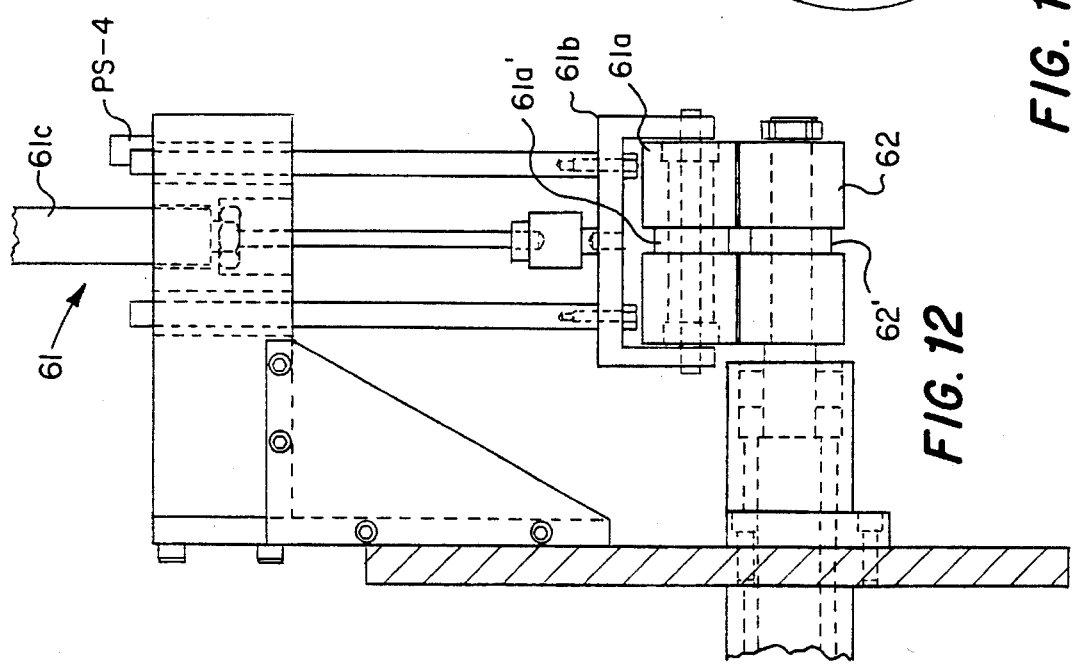
FIG. 13
FIG. 14A
FIG. 14
FIG. 12

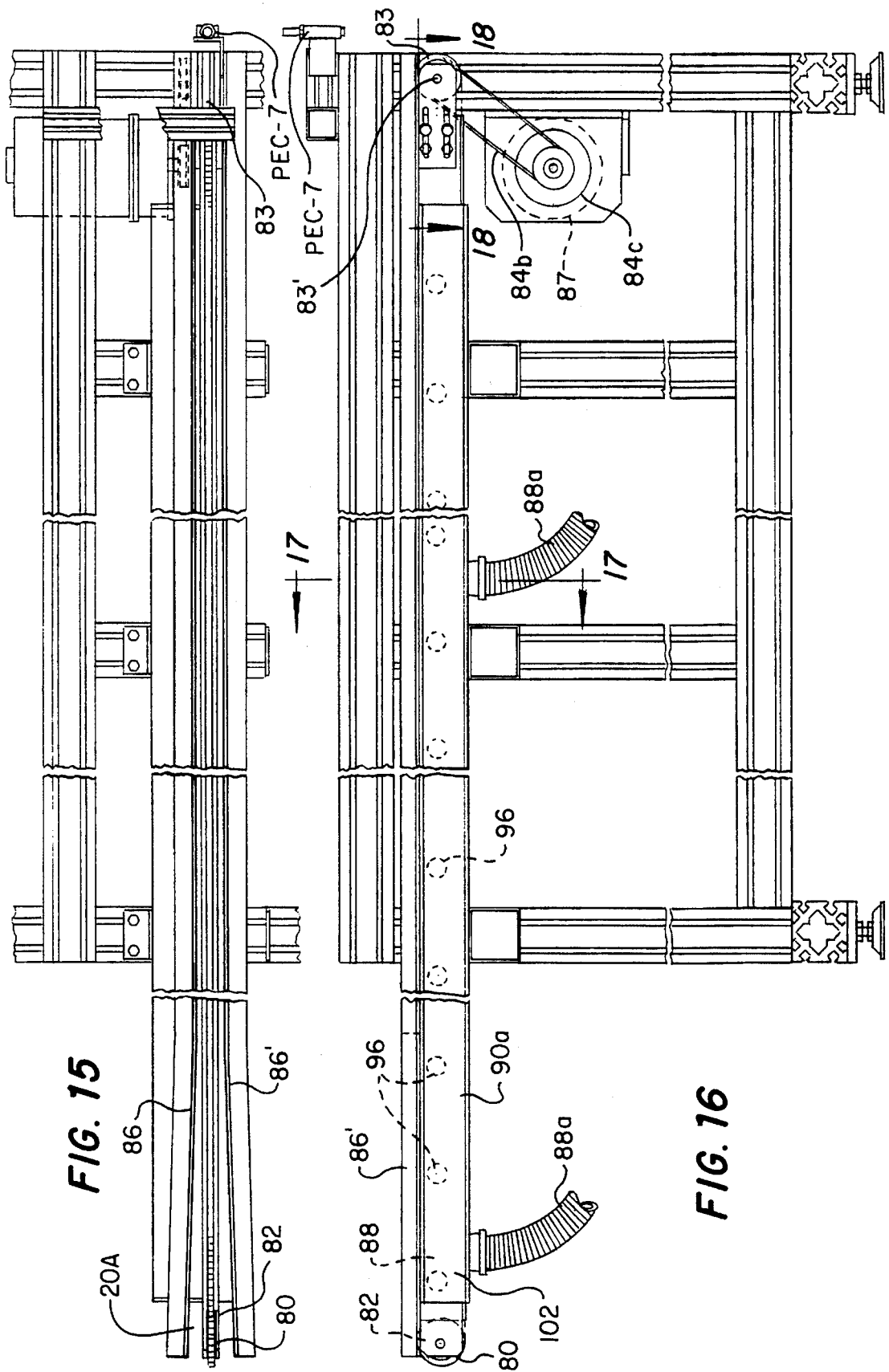

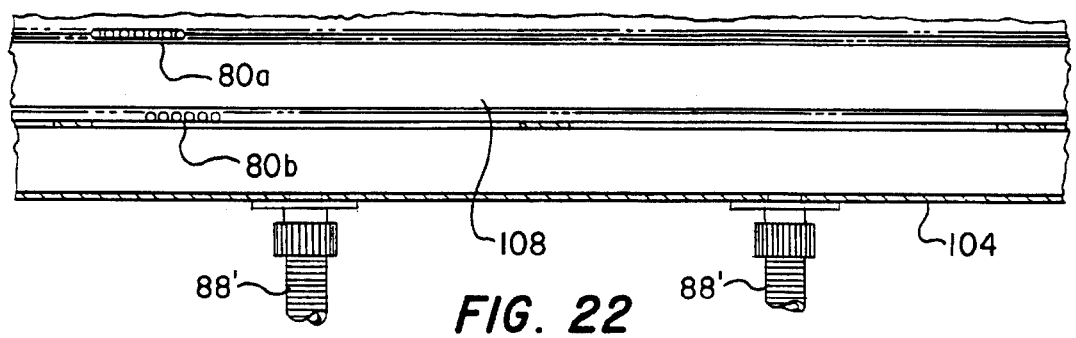
FIG. 22
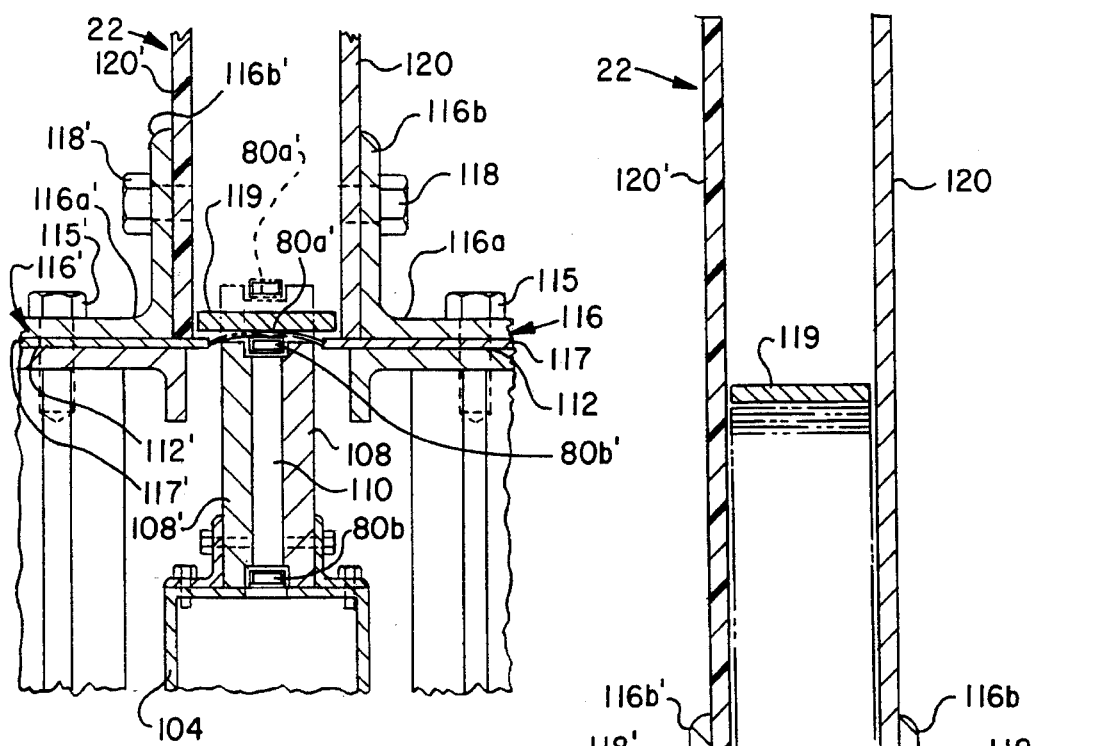
FIG. 23A
FIG. 23B

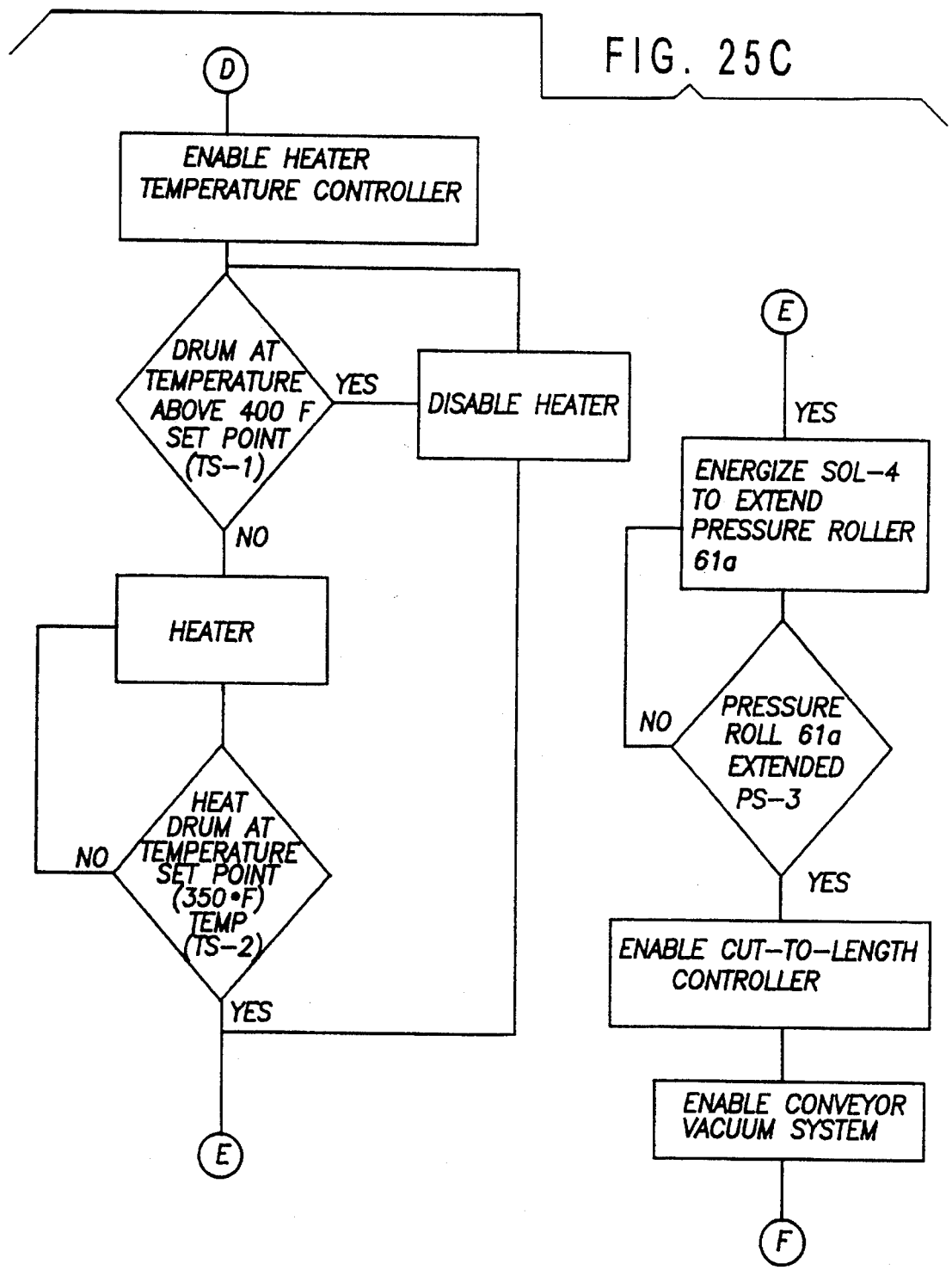

METHOD FOR FABRICATING HONEYCOMB INSULATING MATERIAL

This is a divisional of U.S. application Ser. No. 07/839,600 filed on Feb. 21, 1992 now U.S. Pat. No. 5,334,275 issued on Aug. 2, 1994.

FIELD OF THE INVENTION

The present invention has its most important application in the mass production of individual stacks of secured together, flat, flexible expandable tubular strips from which expandable honeycomb panels of a desired overall width and expandable length can be cut. Fabricators then assemble the pleated panels with various hardware, like support rails and pull cords, to form the completed assembly which is installed in the user's homes to cover windows and other openings.

The present invention in its most preferred form deals with a method and apparatus for receiving a web forming a continuous, expandable flat tube, and by a unique combination of adhesive-applying and stacking operations, and unique control and stacking apparatus, efficiently and reliably produce and package stacks of secured-together, together, flat, flexible expandable tubular strips.

BACKGROUND OF INVENTION

Various methods and apparatus have been heretofore developed for making said expandable honeycomb panels. Most, if not all, of these methods leave much to be desired from the standpoint of production efficiency.

Dutch Application Serial No. 6706563 of Landa, published Nov. 11, 1968 discloses the formation of such a panel from a number of narrow webs of thermoplastic material each of which are unwound from a roll in an unfolded state. The longitudinal edges of each web are tightly folded over, an end strip of a given length is then severed from each web, and the severed strips are then simultaneously superimposed. The superimposed strips are then welded together to form an expandable honeycomb panel.

U.S. Pat. No. 3,493,450 to Judge, Jr. discloses a method of making expandable honeycomb panels by applying laterally extending bands of adhesive to a web of sheet material and cutting individual strips from the web. A vacuum pick-up device picks up the severed and adhesive coated strips of material and sequentially delivers the individual strips above a stacking station where they are stacked one upon the other. In the process of being stacked, the adhesive adheres the adjacent strips together to form an expandable honeycomb panel structure. The completed honeycomb structure is then cut into narrow strips of a desired width to form expandable honeycomb panels.

U.S. Pat. No. 4,450,027 to Colson discloses another method and apparatus for making expandable honeycomb insulation panels. Like the method disclosed in the Judge, Jr. Patent, the Colson method starts with a continuous web of unfolded material and, like the method disclosed in the Landa published application, progressively folds over the opposite longitudinal edges of the web. The Colson method then applies a contiguous band of adhesive to one side of the web. The adhesive-coated continuous web, unlike the method disclosed in the Landa and Judge, Jr. prior art, is continuously wound on a rotating stacker. The wound web is removed from the stacker and cut into separate stacks of a desired length.

The present method and apparatus to be described produces in a very efficient and reliable manner, and, in the most preferred form of the invention, monitored and packaged, individual stacks of expandable honeycomb material, and without infringing known patents of others.

SUMMARY OF THE INVENTION

The present invention preferably starts with a single web or sheet forming a continuous flat tube or tubular web. The flat tube could be formed in any manner for the purposes of the present invention. An adhesive is preferably applied to the web in one or more discontinuous bands running longitudinally of the web, although in accordance with broadest aspects of the invention, it could less desirably be applied to the strips after being cut from the web. The adhesive coated web is sequentially cut into strips, and then sequentially stacked in a unique manner which is completely different from that carried out in all of the aforesaid described prior art methods.

The preferred form of the present invention, like a bottom stacking system disclosed in copending application Ser. No. 07/773,843, filed Oct. 7, 1991, entitled "Method and Apparatus for Fabricating Honeycomb Insulating Material" filed in the names of Kay L. Ruggles, Cary L. Ruggles, Bryan K. Ruggles, Kerry Strauss and Dennis Buehner, includes a vertical stacking chamber positioned above an inlet station. The elevated bottom floor of this chamber has a longitudinally extending strip pass-through slot which is narrower than the width of the strips to be delivered thereto and of a length to receive each strip. Each strip, preferably coated with adhesive along the central region thereof, is delivered one at a time at spaced time intervals to a position beneath this slot. Each strip is then pushed up through this slot and against the bottom face of the strip in the chamber above it, where it is bonded to this strip. While the defining walls of the slot could be defined by a pair of spaced resilient strips which flex as the narrower more rigid yet flexible strips are pushed thereby, it is preferably defined by spaced rigid walls, so that each flexible strip bows upwardly as it is pushed through the slot.

Good bonding of all the strips to be stacked is achieved by providing both an upward and downward force on the strips in the stacking. The upward force is achieved by pushing the new strip into the stacking chamber to a degree which raises the strips above it. The downward force can be achieved by a weight bar placed in the chamber which is progressively raised by the strips being stacked in the chamber below it. When the chamber is full, the bar and the stacked strips are removed from the chamber.

In accordance with an improvement in this aspect of the invention, the downward force on the strips in the stacking chamber is achieved by the weight of the strips in the stacking chamber which continuously delivers the strips from the top thereof, preferably onto a downwardly and forwardly inclining back-lighted translucent wall. This back-lighted wall allows the operator to monitor the slightly expanded strips for defects. Defective strips are cut away by the operator. This inclined wall merges with a vertical guide wall which directs the monitored strips into the opened top of a box which is the packaging used to ship the product produced by the present invention to the fabricators of expandable honeycomb panels.

Prior to this basically new bottom stacking technique just described and claimed in said copending application Ser. No. 07/773,843, the only prior art bottom stacking systems known to applicants which stack pieces of material from the bottom of the stack did so with pieces of rigid sheet material. When these rigid sheets are delivered to the inlet of a stacking station, they engage a vertical abutment which aligns the pieces and makes it readily possible to stack successive pieces from the bottom of the stack. Examples of this prior art are the stacking systems shown in U.S. Pat. No. 3,866,765 to Stobb and U.S. Pat. No. 3,834,290 to Nelson. (Such an abutment wall is not suitable for stacking the flexible strips used to make honeycomb panels.)

The preferred form of the invention described and claimed herein uses apparatus for pushing the flexible strips up through the narrower slot in the bottom of the stacking chamber in a completely different manner than that disclosed in copending application, Ser. No. 07/773,843. As there disclosed, the strips are preferably delivered below the strip pass-through slot of the stacking chamber by a pair of laterally spaced suction conveyor belts. A narrow raisable pusher bar is mounted to pass between the belts and through the slot in the floor of the stacking chamber, to push the strip held by suction on the belts off the belts and into the stacking chamber. Because there is no fixed connection between the pusher bar and the strip, to obtain proper lateral alignment of the strips in the stacking chamber disclosed in this pending application, it was found helpful as a practical matter that the bottom of the stacking chamber be defined by a pair of vertical confronting walls which are spaced apart a distance slightly greater than the width of the strips. These walls thus laterally align each strip being pushed into the stacking chamber with the strip above it.

Also, to avoid waviness in the stack of secured together strips produced in the stacking chamber, it was found necessary in the equipment shown in this pending application that each of the strips be adhesively secured to some strip above it along substantially one or more continuous adhesive bands. When using such a pusher bar, it was found that it was not practical to form separable stacks of strips in the stacking chamber since, in such case, the uppermost strip in each stack could not be secured to the bottom face of a strip of the stack above it, and thus it could sometimes assume an uneven configuration which affected the strips below. To eliminate this problem in the equipment disclosed in this pending application, the first strip to be stacked in the stacking chamber is there secured to a rigid strip placed in the stacking chamber just below the weight bar, before the stacking of the flexible strips begins. As a practical matter, all strips in the chamber are here secured together and so separable stacks of strips are not formed in the stacking chamber. These must be formed by cutting individual stacks of strips from the continuous stack of secured together strips after removal of the weight bar and the stack of strips from the stacking chamber.

In accordance with one of the features of the present invention, to overcome these problems and to make it readily possible to form separable stacks in the stacking chamber, each strip delivered to the inlet of the stacking chamber is raised into the stacking chamber and pushed against the strip above it by a pusher means which retains the strip to it by suction force. Therefore, the upper face of every strip which is pushed against the strip above it in the stacking chamber is laterally aligned by this pusher means and presents a perfectly flat horizontal surface as it is pushed against the strip above it by virtue of the suction force which draws the strip against the flat face of this pusher means.

The separation of this pusher means from the strip pushed into the stacking chamber thereby is achieved as the pusher means is lowered from its raised position and passes down through the slot in the bottom of the stacking chamber. The strip separates from the pusher means as it is pulled against the floor of the chamber by the pusher means. The floor holds the strip against further downward movement with the pusher means. The suction force must, of course, be initially adjusted so as to be insufficient to pull the flexible strip back through the slot.

In the preferred from of the present invention, the pusher means is a single apertured endless conveyor belt which delivers the strip to the stacking chamber inlet. The belt is sufficiently narrow to be passable through the narrow slot in the floor of the stacking chamber. When the belt delivers a strip opposite the inlet to the stacking chamber, its longitudinal movement is stopped and support structure for the belt is raised to push the strip carried thereby into the stacking chamber.

Other features of the invention deal with the adhesive-applying apparatus and the pattern in which said adhesive is applied where separable stacks of strips are to be formed in the stacking chamber. One very important feature of the adhesive-applying apparatus is that, instead of using what is conventionally a circular discharge port, the discharge port is rectangular in shape with the longitudinal edges of the slot parallel to the direction of movement of the web and to the longitudinal edges of the web. Such a discharge port deposits an adhesive bead of a desired consistent thickness and produces a band of adhesive with perfectly parallel precisely located edges. While rectangular adhesive discharge ports have been used for depositing rectangular beads of adhesive, to the knowledge of the applicants, such ports have not been used to deposit continuous bands of adhesive, especially in the manufacture of expandable honeycomb panels.

As previously indicated, while the adhesive could be applied to the strips after they are severed from a continuous web, it is most advantageously applied to the top of the web before the strips are cut therefrom. If the adhesive were applied to the strips after they have been severed from the web, the adhesive applicator must be turned on and off quickly as the short strips pass thereby, so that adhesive will not drip in the gaps between the strips. It is very difficult if not impossible to avoid some spill-over into these gaps if the web is moved by the applicator at a speed to achieve practical production efficiencies.

In accordance with another aspect of the invention, the adhesive is applied as discontinuous bands in a pattern related to the problems in the prior art of adhesive dripping from the adhesive discharge ports after adhesive flow thereto is terminated by the close of the valve, and to variations in adhesive consistency due to variation in its temperature when it is deposited on the web. Thus, where the stacking chamber is to contain separable stacks of strips of a length L, the adhesive applicator means is shut off when widely spaced web segments each of a length L pass the adhesive applicator means and which are to constitute the first strip in the various secured together stack of strips to be formed in the stacking chamber. The adhesive-free first strip in each stack desirably will not then stick to the strip above it. In the most preferred form of the invention, to avoid production of adhesive-free strips to be stacked with undesired spill-over of adhesive thereon, the adhesive applicator means is initially shut off before the portion of the web passes thereby which is to form the first adhesive-free strip in a stack, so that one or more segments of a length L of the web pass thereby are formed as throw-away strips prior to the beginning of a strip stacking operation and following the stacking of the last strip of each separable stack. These one or more throw-away strips are not stacked, and so the conveyor belt passing below the stacking chamber inlet is not stopped and raised when these strips are moved below the stacking chamber.

The need to form at least one throw-away strip is due to the inability as a practical matter to instantly cut off all flow of adhesive from the adhesive applicator means as the trailing end of a segment of the web which is to form the last strip of each separable stack to be formed in the stacking chamber passes by the adhesive applicator means. Some adhesive accumulates below the shut-off valve in the applicator head of the adhesive applicator means which adhesive continues to drip therefrom for a given interval of time after valve closure. This can undesirably coat one or more web segments which will form strips to be stacked which are to be free of adhesive.

Other features of the invention claimed herein and described in the specification to follow improve the efficiency, set-up convenience, and reliability of the method and apparatus aspects of the invention. For example, the efficient fabrication of consistently good quality expandable honeycomb panels requires the delivery of adhesive bands onto the web with the same thickness, width, and consistency. For reasons to be explained, this is difficult to achieve unless at the initiation of each opening of the valve in the adhesive applicator head one or more throw-away strip-forming segments of the web are generated.

DESCRIPTION OF DRAWINGS

FIG. 9A is an enlarged plan view of the cooling table shown in FIGS. 7 and 8 as seen in viewing plane 9A—9A shown in FIG. 8;

FIG. 9B is a fragmentary vertical sectional view through the apparatus shown in FIG. 9A, as seen in viewing plane 9B—9B in FIG. 9A and shows the tip of an adhesive applicator head applying adhesive to the top of the web passing over the cooling table;

FIG. 9C is a bottom plane view of the adhesive discharge ports as seen in viewing plane 9C—9C in FIG. 9B;

FIG. 9D is a fragmentary longitudinal sectional view through the cooling table behind the first adhesive applicator head and showing a heat sinking block riding on the folded web;

FIG. 10 is a plan view of the cutting apparatus which follows the adhesive-applying and cooling apparatus shown in FIGS. 7, 8, 9A and 9B;

FIG. 11 is a front, elevational view of the apparatus shown in FIG. 10;

FIG. 12 is a vertical, sectional view through the apparatus shown in FIG. 11, as seen in viewing plane 12—12;

FIG. 13 is a vertical, sectional view through the apparatus shown in FIG. 11, as seen in viewing plane 13—13;

FIG. 14 is a sectional view through the apparatus shown in FIG. 13, as seen in viewing plane 14—14;

FIG. 14A is a sectional view showing the cutting apparatus in the process of cutting through a web passing over a driven roller;

FIG. 15 is a plan view, partially broken away, of the first conveyor which delivers strips from the cutting apparatus to the second conveyor located beneath the stacking chamber;

FIG. 16 is a front, elevational view of the apparatus shown in FIG. 15;

FIG. 17 is a vertical sectional view through the apparatus shown in FIG. 16 as seen in viewing plane 17—17, and illustrates the manner in which a vacuum pump inlet tube is connected to portions of the equipment which directs suction pressure to the upper section of an endless conveyor belt or chain of the first conveyor;

FIG. 18 is a horizontal sectional view through the end of the first conveyor shown in FIG. 16, as seen in viewing plane 18—18 therein;

FIG. 22 is a vertical sectional view through the stacking chamber and belt conveyor as seen in viewing plane 22—22 in FIG. 21;

FIG. 23A is an enlarged fragmentary vertical sectional view through the stacking chamber and the second conveyor and shows in solid lines the upper section of the endless conveyor chain of the second conveyor raised partially to push the first strip into the stacking chamber and in dotted lines the chain when it is raised to its narrow height;

FIG. 23B is a view corresponding to FIG. 23A when a number of strips have been pushed into the stacking chamber and the second conveyor as shown in sold lines has been lowered to its normal position below the stacking chamber the figure showing in dashed lines;

FIGS. 25A–G considered together is a program flow diagram illustrating the manner in which the equipment shown in the drawings is operated and controlled from the various sensors shown therein.

DESCRIPTION OF PREFERRED

Exemplary Forms of the Invention

Figure 1:
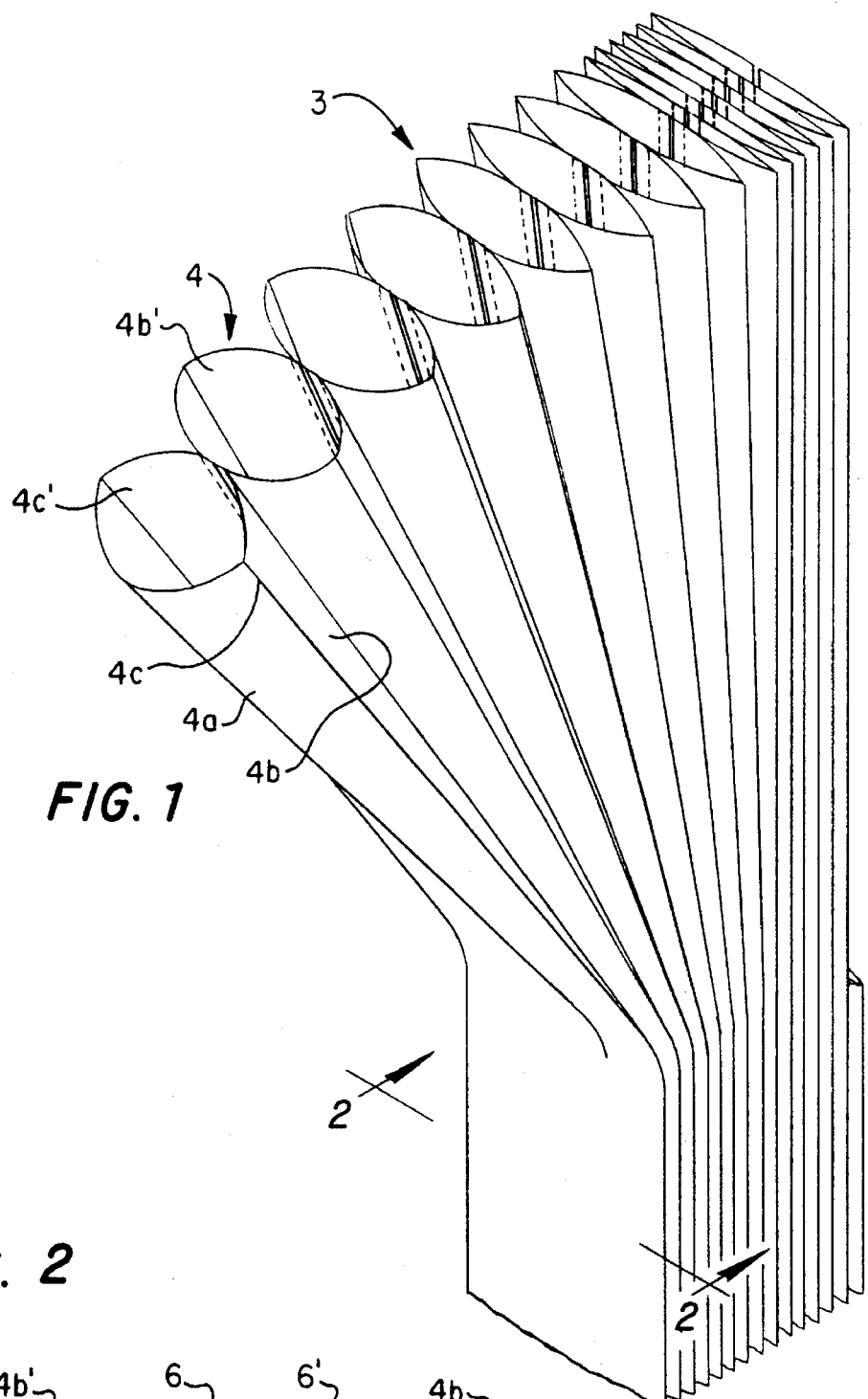
FIG. 1 is a perspective view of a part of one of the stacks of expandable honeycomb insulation material made by the method and apparatus of the present invention.
Figure 2:
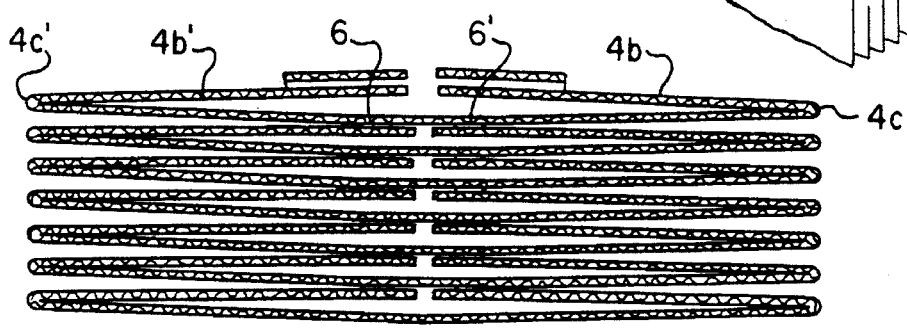
FIG. 2 is a transverse section through the stack of FIG. 1, taken along section line 2—2 therein.

FIGS. 1 and 2— Product Made By the Present Invention

FIG. 1 is a perspective view of a part of one of the stacks 3 of expandable honeycomb insulation material made by the method and apparatus of the present invention, where the expandable honeycomb material is of the form disclosed in Dutch application Ser. No. 6,508,988 of Landa, published Jan. 13, 1967. As shown in FIG. 1 herein, the stack 3 is made up of individual folded strips 4 of flexible material each forming a flattened, expandable tube when secured to the next strip by bands 6—6' of adhesive shown in FIG. 2. The strips as illustrated are preferably formed from an initially unfolded web of a suitable flexible thermoplastic polyester or similar material used to make expandable honeycomb panels which cover windows and the like. The opposite longitudinal edge portions of the strip are preferably folded over at 4c—4c' in any desired way into contiguous but spaced relation to form permanently tightly folded over panels 4b—4b' overlying a bottom panel 4a. The strips 4 are cut from this web preferably after the bands 6—6' of adhesive are applied to the top portion of the web which is to form all but the first strip in the stack. The bands 6—6' of adhesive are applied only to the confronting end portions of the folded over panels 4b—4b'.

As previously indicated, the features of the present method and apparatus invention are applicable to tube-forming strips formed in ways other than by a folding process. Thus, for example, the panels 4b—4b' could constitute a single integral panel which is secured together to a separate panel of the same width at the opposite longitudinal margins of these panels. In either case, individual tube-forming strips are-adhesively secured together and stacked in the unique manner previously described.

Figure 3:
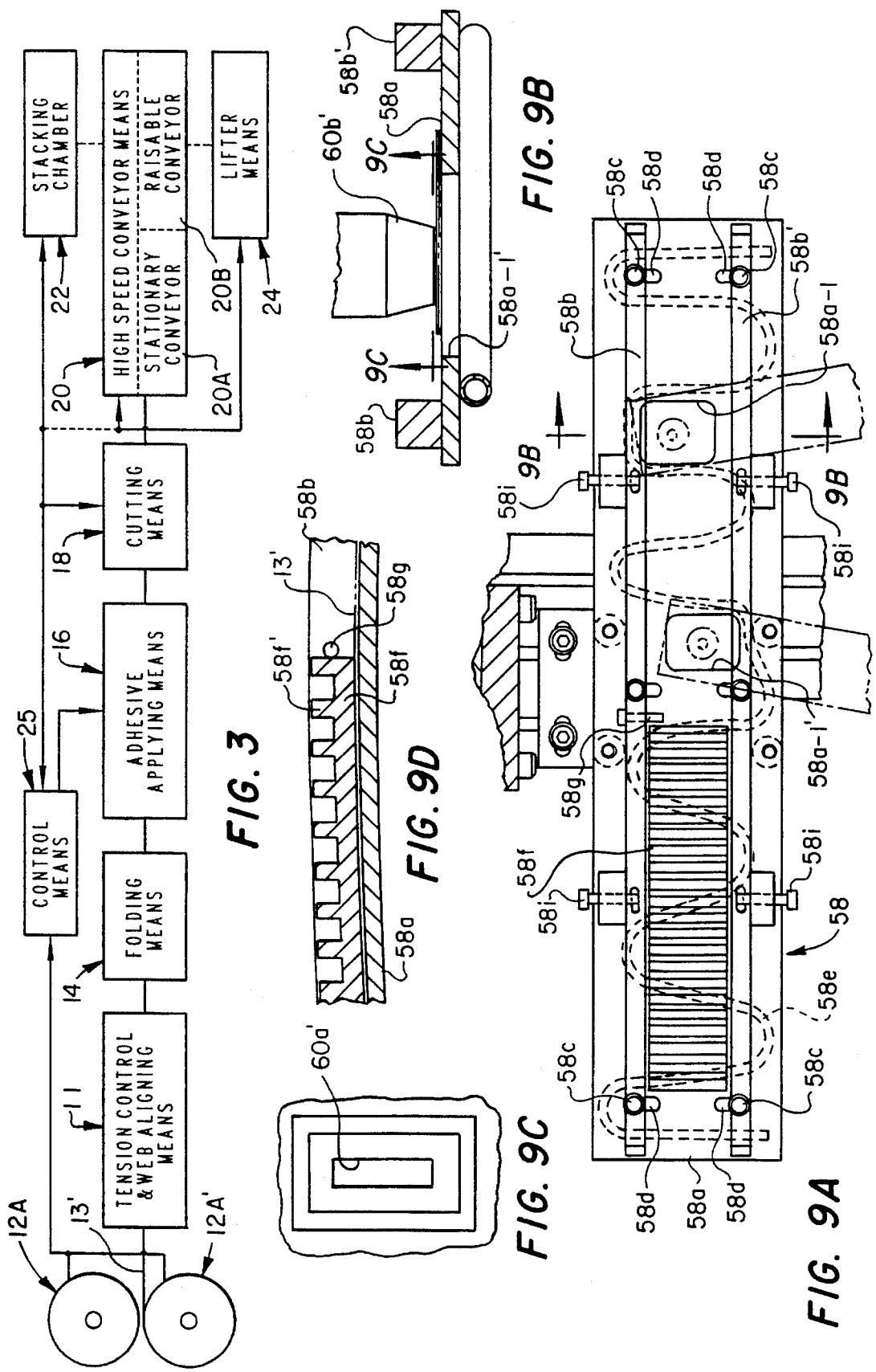
FIG. 3 is a block diagram showing the basic process steps and apparatus elements of the present invention.

FIG. 3— Basic Block Diagram of the Invention

FIG. 3 illustrates in block form the basic method steps and apparatus elements used in the preferred form of manufacturing the stack 3 shown in FIGS. 1 and 2. A support structure is provided for preferably supporting two reels 12A—12A' holding webs of flexible polyester or similar material to form honeycomb panels. The web of the bottom reel 12A' is identified by reference numerals 13'. Only one of the reels 12A or 12A' is unwound at any time and passes through the apparatus to be described. When one of the reels has been used up, the leading edge of the web of material wound on the other reel is spliced to the end of the completely unwound web by a suitable splicing tape, splicing thread or staples. Frequently, the web on the reels 12A—12A' have splices therein. Splices portions of the web which are located in strips cut from the web are automatically disposed of and are not stacked in the stacking chamber to be described.

As illustrated, the unfolded continuous web 13 or 13' of the roll 12A or 12A' is fed to conventional web tension and aligning means 11. The web is then fed to folding means 14 which folds over the opposite longitudinal edge portions of the web to form the configuration of the folded strips 4 shown in FIGS. 1 and 2. The folded web is then preferably fed first to adhesive applying means 16 having the unique rectangular, adhesive discharge ports previously referred to, and then to cutting means 18 which cuts individual tube-forming strips from the web. As previously explained, the adhesive applying means applies adhesive bands to the spaced inner end portions of the folded over web edge portion in a preferred discontinuous pattern.

This discontinuous pattern produces separable stacks of secured-together strips in the stacking chamber, each stack comprising a number of strips N of a length L. When a stacking mode of operation is in effect, the adhesive applicator means is turned on and off in a repetitive pattern which produces a to-be-stacked first adhesive-free strip at the beginning of each stack, also preferably ahead of the latter strip a to-be-stacked adhesive-free separator strip, and N−1 adhesive coated strips following the former first strip.

To avoid the overlap of adhesive onto the first strip of each stack of strips to be stacked in the stacking chamber to be described, because of undesired dripping of the nozzles of the adhesive-applying means, as previously indicated this pattern also produces at least one, and preferably three, adhesive-free throw-away strips ahead of the two above-mentioned to-be-stacked adhesive-free strips. These throw-away strips are not stacked in the stacking chamber.

Also, following the insertion of the adhesive-free separator and first adhesive-free strip of each stack at least one, and preferably three adhesive-coated, not-to-be-stacked strips are produced, to assure an even continuous bead of adhesive on the strips subsequently to be stacked for reasons now to be explained.

The present invention preferably utilizes commercial thermosetting resin adhesive applying equipment where the resins are pre-heated to a desired temperature and deposits adhesive on the web in a consistent pattern and thickness and which partially sets to a desirable extent before the strips are removed from the stacking chamber. This commercial equipment generally has heating elements at the adhesive discharge nozzle of the adhesive applicator means and also along the conduit which delivers the adhesive to the nozzle from a supply source thereof. The temperature and thus the consistency of the adhesive is affected by the length of time the adhesive remains in the nozzles and the feed conduit. Therefore, adhesive which remains in the feed conduit behind a nozzle closed to produce adhesive-free strips could heat up to a higher temperature and have a different consistency from that of the adhesive which flows from the nozzle a few seconds later and which was not in a stationary state in the heated feed conduit. Accordingly, each time an adhesive applicator valve is opened to permit the initial flow of adhesive therethrough, the first few strips which are coated with adhesive are thrown away and not fed into the stacking chamber. Of course, this problem would not be present where the adhesive applicator nozzles apply continuous bands of adhesive on the web.

In summary, to avoid any possibility of adjacent stacks of secured together strips from stacking together because of dripping adhesive and to assure consistency of the adhesive bands, the adhesive-applying means is turned on and off in the following repetitive pattern:

(a) Turn-off of the adhesive applying means is initiated as three web segments of a length L pass thereby;

(b) Where, as preferred, an adhesive-free strip is to separate each stack of strips in the stacking chamber, the adhesive applying means is further shut off as the next to-be-stacked two web segments of a length L pass thereby;

(c) Turn-on of the adhesive applying means is initiated as the next three throw-away web segments, each of a length L pass thereby;

(d) Turn-on of the adhesive applying means is continued as the next to-be-stacked N−1 segments of the web pass thereby (N being the number of strips in each secured together stack of strips); and (e) A new cycle is initiated as the last of the to-be-stacked N−1 segments of the web passes by the turned-on adhesive applying means where initiation of the turn off of the adhesive applying means begins to form three throw away segments.

The web is severed at the beginning and end of each of the web segments referred to and, as previously indicated, the strips formed from the thrown-away segments of the web are not stacked in the stacking chamber to be described.

The adhesive material is preferably an initially liquid polyurethane thermosetting adhesive resin which sets partially in a relatively short period of time so that adjacent strips will be secured together to a sufficient degree when removed from the stacking chamber to be described that they can withstand the rigors of subsequent handling. The adhesive cures completely over a long period of time to withstand the much greater pulling forces when the panel is assembled to support rails and pull cords, mounted over a window or doorway by the ultimate user and then raised and lowered many thousand times in the useful life of the panel. Many such adhesives have been used in the prior art. One suitable adhesive is made by H. B. Fuller Company of 1200 Wolters Boulevard, Vadnais Heights, Minn. 55110, purchased from this company under the order designation NP-2028. When this is the adhesive used, the temperature thereof when deposited on the web for the exemplary web material described below is preferably 239° Fahrenheit.

Various feed and guide rollers forming a part of the tension and web aligning means 11, folding means 14, adhesive applying means 16 and cutting means 18 constitute conveyor means described in some claims as a first conveyor section. One unique aspect of the invention is that these feed and guide rollers are most advantageously cantilevered rollers so that when the equipment of the invention is set up for operation, it is an easy matter to apply the unwound portion of the web into position where it extends over the various feed and guide rollers leading to and including the cutting apparatus.

The first conveyor section, which may feed the web to the cutting apparatus at a speed of 250 feet per minute, delivers the individual strips to a higher speed conveyor means 20 referred to in some of the claims as a second conveyor section.

The high speed conveyor means operate at a much higher speed than the peripheral speed of the feed rollers associated with the first conveyor section so that the strips 4 cut from the folded web are conveyed to the inlet station of stacking chamber 22 at spaced time intervals. This permits a strip delivered to the inlet of the stacking chamber to be stacked in the vertical stacking chamber 22 by a lifting means 24 which moves from an initial lowered position to a raised position and then returned to a lowered position before the next strip is delivered to the stacking chamber.

This second conveyor section most desirably consists of a first high speed conveyor 20A sometimes referred to as an accelerator conveyor. It is formed by an endless conveyor belt or chain having apertures through which suction force is applied which retains the strips conveyed thereby in a fixed position thereon. This first conveyor is stationary in the sense that it is not raisable. This first conveyor delivers the strips to a second high speed conveyor 20B also sometimes referred to as a stacker conveyor. It also most advantageously comprises an endless conveyor belt or chain also having apertures through which suction force is applied which retain each strip as it is delivered to the stacking chamber in a fixed position. The first high speed conveyer operates at a substantially higher speed than the web is fed through the first conveyor section to the cutting apparatus 18. The speed of the first high speed conveyor described could be 750 feet per minute and the speed of the second high speed conveyor desirably could be 800 feet per minute.

As described previously, the bottom of the stacking chamber 22 is defined by a pair of laterally-spaced support shoulders or walls which form a strip pass-through slot in the floor of the stacking chamber. When the conveyor belt of the second high speed conveyor moves a strip to be stacked in alignment with the slot, the belt movement is temporarily stopped and it is raised through the slot to carry the strip into the stacking chamber to an extent to raise the stack of strips above it. In so doing, the adhesive bands on the top of the strip which have not yet completely hardened, are pressed against the bottom panel 4a of the strip above it, to better adhere the two adjacent strips together. The drying time of the adhesive is sufficient that the strips are securely adhered by the time each stack of strips is removed from the stacking chamber.

When the conveyor belt of the second high speed conveyor is stopped, the suction applied to the belt continues. It was found, however, that depending upon the weight of the strip carried by the belt, there is a slight longitudinal shifting of a strip due to momentum affects when the belt movement is stopped by the brake. The amount of such shifting is dependent on the weight per given length of the strip and its friction with the belt. In the control system shown in the program flow diagrams of FIGS. 25A–25G, depending upon the selected strip material, a varying brake operation delay is introduced into the control system so that when a brake-initiating signal is generated upon the second high speed conveyor 20A the delay is determined by the selected web material. This information is by manual switch operation fed to the system software. Thus, for a heavier per length material, the braking delay period will be a lesser time than for lighter per length materials.

To aid in the adhesive securement of adjacent strips together in the stacking chamber, a downward force is applied to the top of the stack. This can be achieved by a weight bar in the stacking chamber. When the stacking chamber has been filled, the conveyor system is stopped so that the weight bar can be removed and the various stacks of secured together strips manually removed from the chamber.

However, in the preferred form of the invention, a weight bar is not used and the stacking chamber is designed to be automatically emptied. In this case, the desired downward force applied to the stacked strips to assure optimum adhesive securement thereof is achieved by the weight of the strips above the strip being stacked below. In such case, the first group of strips which are stacked in the chamber can be discarded to avoid poorly adhered together strips from being used by the fabricator to form expandable honeycomb panels which are sold to the ultimate users thereof.

For reasons previously explained, the operation of the lifting means 24 and the braking apparatus which stops movement of the high speed conveyor 20b located below the stacking chamber is disabled where the preferably first three strips in advance of the first strip of each stack is moved below the stacking chamber. The braking apparatus and lifting means are also disabled where the preferably three strips following the first to be stacked adhesive-free strip of each stack are moved below the stacking chamber. These six strips which are not stacked are thrown off the end of the upper section of the endless conveyor belt forming the second high speed conveyor 20B.

It will be recalled that one of the most important features of the present invention is that the lifting means, which preferably is an endless conveyor belt forming part of the high speed conveyor 20b, uses a suction force applied through apertures in the belt to both fix the lateral and longitudinal position of the strip being moved into the stacking chamber and to present a flat, unwrinkled, horizontal adhesive-coated surface to the bottom face of the strip above it when the former strip is pushed against the latter strip by the upward movement of the belt into the stacking chamber. The lateral dimensions of the stacking chamber in such case is non-critical. This assures that the various successive strips of each stack of strips are adhered together evenly to avoid wrinkling of the stack. This produces a very attractive, high quality, honeycomb panel product.

While the use of a lifting means in the form of a raisable suction belt conveyor is the most preferred form of the invention, a broader aspect of the invention includes the use of a pusher bar with suction holes in the top surface thereof rather than the conveyor belt as the raisable lifter element. For example, the second high speed conveyor can comprise a pair of laterally spaced conveyor suction belts which are not raisable. The pusher bar is movable between these conveyor belts and through the pass-through slot in the bottom of the stacking chamber. The conveyor belts in such case are preferably not stopped during the stacking operation.

As explained in the introductory part of the specification, the strips moved into the stacking chamber are separated from the suction lifting means as the lifting means moves down through the pass-through slot in the bottom of the stacking chamber. The defining walls of the slot retain the strip in place in the stacking chamber as long as the suction force involved is not so strong as to pull the strip back through the slot. Obviously, the suction force is adjusted to avoid this undesirable result. In the application of the invention where the web is the exemplary material to be described, the suction force is preferably −2 psi.

As previously indicated, the timing of the operation of the adhesive applying means 16, the cutting means 18, the conveyor braking means and the lifting means 24 is controlled by suitable control means indicated in the block diagram of FIG. 3 by block 25. Various sensors associated with these means which sense the location of the margins of the web are strips cut therefrom and the positions of parts of these means control the operation of various preferably software counters, relays and solenoids. The detailed manner in which the control means 25 operates is illustrated in the detailed program flow diagrams of FIG. 25A–25G which are self-explanatory. In the portion of the specification to follow, most preferred forms of the apparatus illustrated by the blocks in FIG. 3 will be described.

Reel Support, Tension Control and Web Aligning Apparatus

Figure 4:
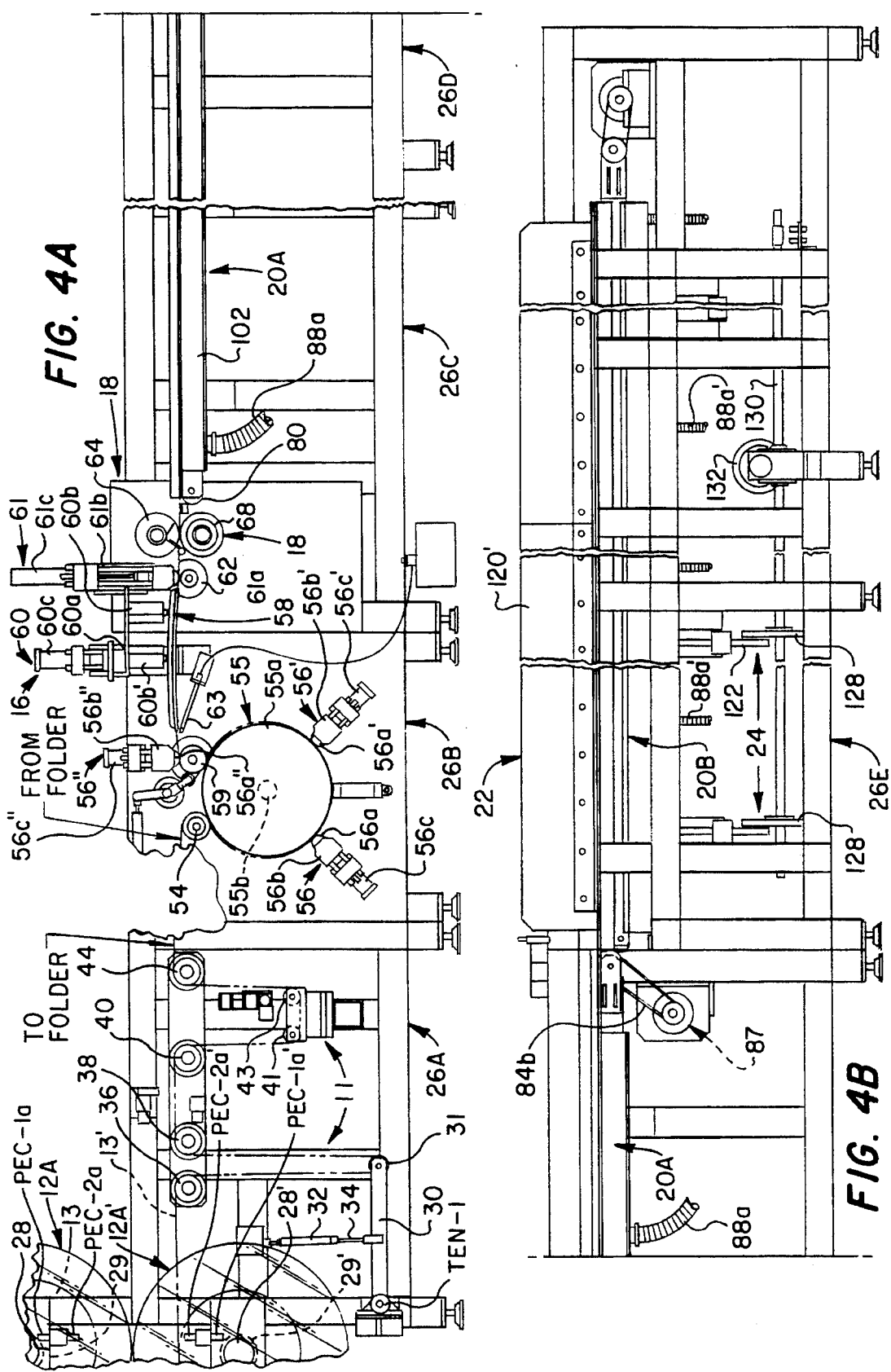
FIG. 4A is a front elevational view of the preferred embodiment of the invention from the web reel support portion to the first high speed conveyor portion thereof which feeds strips cut from the web to a second conveyor located below the stacking chamber.
FIG. 4B is a front elevational view of the preferred embodiment of the invention which is a continuation of FIG. 4A and includes the second conveyor positioned below the stacking chamber and shown also in the stacking chamber and structure which raises and lowers the second conveyor.
Figure 5:
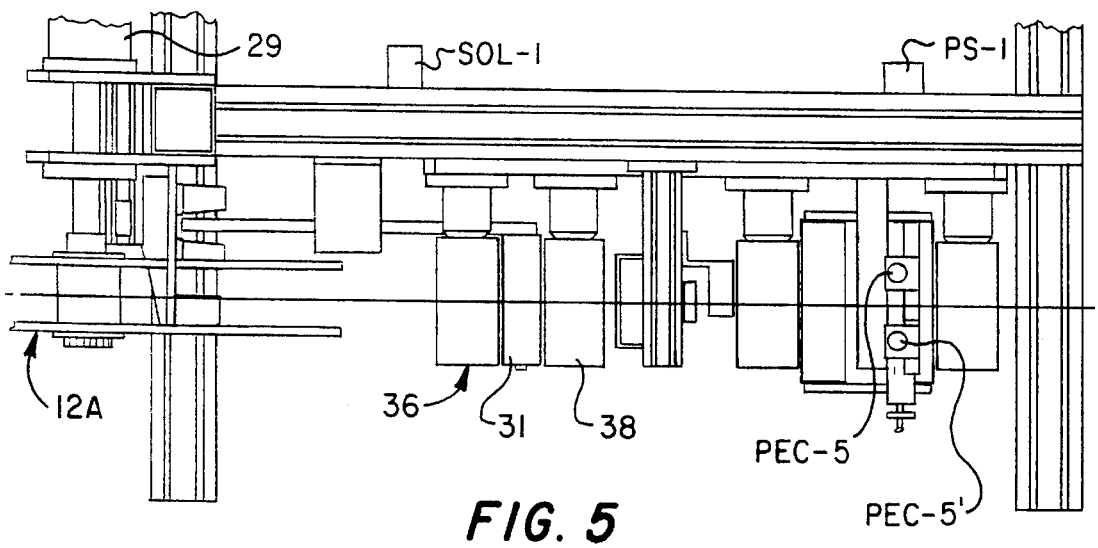
FIG. 5 is an enlarged plan view of the portion of the apparatus shown in FIG. 4A which includes the web reel supporting structure and tension control and web aligning apparatus following that structure.
Figure 6:
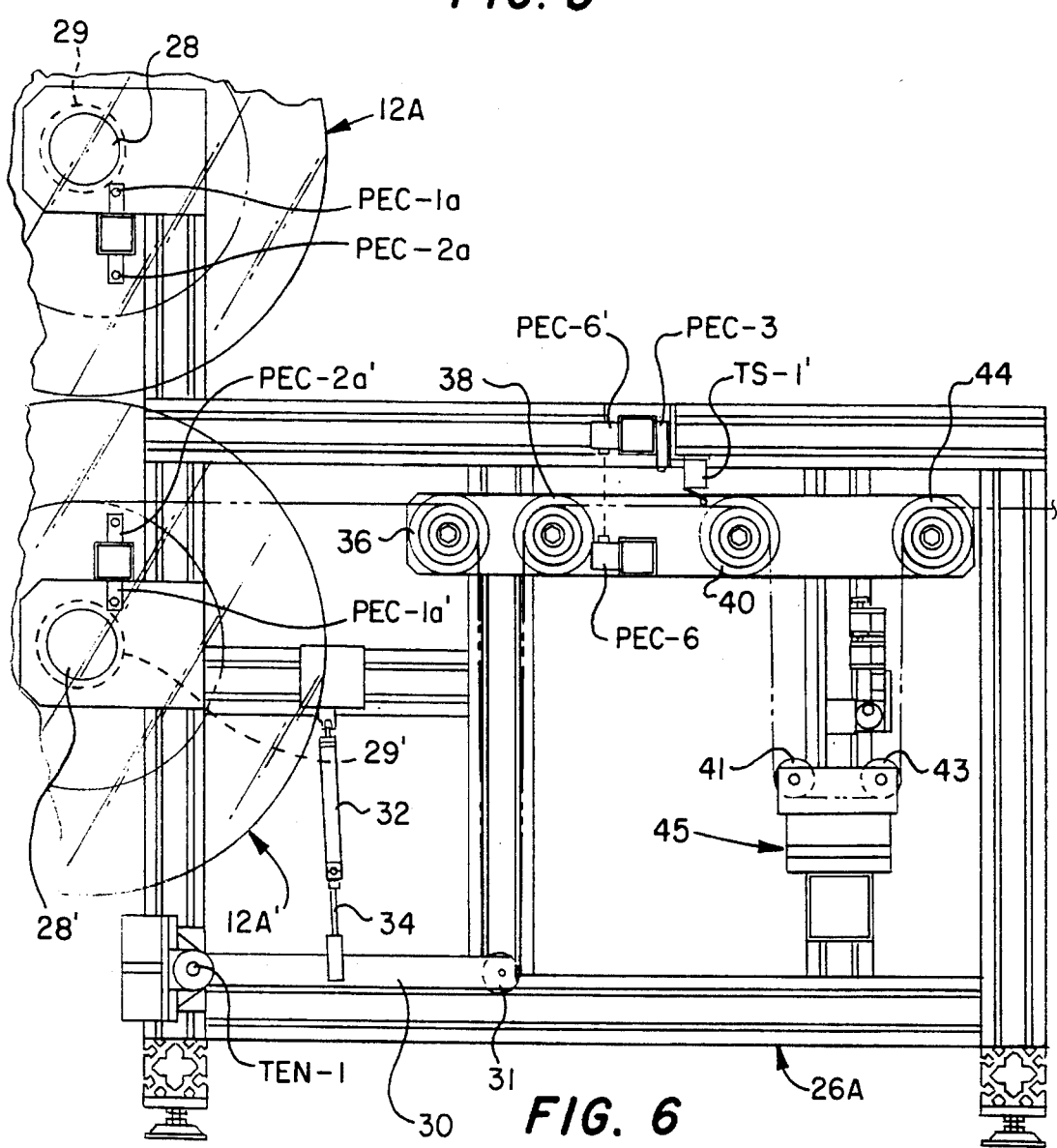
FIG. 6 is an elevational view of the apparatus shown in FIG. 5.

Referring now to FIGS. 4, 5 and 6, the reels 12A—12A' of web material 13—13' are fixed to rotatable shafts 28—28'. The shafts 28—28' are connected to suitable variable friction brake mechanism 29—29'. Such mechanism can be purchased from the Electroid Company, 45 Fadem Road, Springfield, N.J. 07081 and sold under Model designation EPB-70-12S-24. These brake mechanisms produce a variable restraining force on the rotation of the reel support shafts 28—28' under control of suitable control signals from variable potentiometers responsive to the position of a dance arm forming part of a web tension control mechanism to be described. This produces a fixed web tension in a manner well known in the prior art. The operator initially selects the web material on the web reel 12A or 12A' for use in the equipment shown.

Supported adjacent to a side of the respective reels 12A—12A' at different radial points therealong are combined light source and light detecting sensor units PEC-1a and PEC-1a', and PEC-2a and PEC-2a', each of which directs a beam against the side of the web material on the reel involved. The presence of a light reflection signal received by sensor unit PEC-2a or PEC-2a' signals a "ready" condition to the software, indicating the presence of a useable reel.

The other light source and light detecting sensor units PEC-1a and PEC-1a' located closer to the center of the associated reels are used to generate a signal upon absence of light reflection which results in the sounding of an audible alarm to alert the operator and the appearance of a prepare-to-change reel command on a suitable display screen (not shown). The operator can then check to see whether the other unused reel is in position on the associated shaft so that he can carry out a splicing operation where the leading edge of the web of the latter reel can be spliced onto the trailing edge of the web material which is unwound from the active reel.

The unwound web of the selected reel extends down over a guide roller 36 and then around tension roller 31 mounted at the end of a dancer arm 30 forming part of a tension control system with the function brake mechanism 29. This tension control system may be a well known electromagnetic tension control system manufactured by Electroid Company, 45 Fadem Road, Springfield, N.J. 07081 and sold under Model designation TC-1. The web passing around the tension roller 31 and pulled by the drive force of a drive roller to be described exerts an upward force on the dancer arm 30. A downward force is exerted on the dancer arm by a pneumatic unit 32 having a piston rod 34 secured to the arm. The movement of the dancer arm controls the operation of a tension control unit TEN-1 sold by Electroid under Model No. TSS-1. This unit generates a signal fed to the brake control mechanism 29—29' exerting an adjustable opposition force to the rotation of the reel shafts 28—28'.

The tension control unit operates to keep the dancer arm 30 horizontal. The downward force of the pneumatic unit 32 is initially adjusted to exert a given predetermined force. For example, in the present invention where the exemplary strip material is material No. 5040 manufactured by the Ashai Company (a strip 0.006 inch thick, 2.25 inches wide before it is folded, and having a density of 40 grams per square centimeter), a 7 pound tension force is applied to the dancer arm 30. If the upward pull force on the dancer arm exceeds this force, the dancer arm will move up and a signal will be fed back to the friction brake mechanism 29 on the selected reel shaft which will reduce the friction force of the shaft. This reduces the tension on the web so as to keep the dancer arm 30 in a horizontal position.

If the web extending around the roller 31 should break and not be present for any other reason, the dancer arm 30 will obviously drop. A suitable microswitch or other sensor may be provided to sense this condition and generate a signal which will stop operation of the conveyor system and other operating apparatus. In the system disclosed, if the web breaks or the web is completely unwound from the active cell this signal is generated by a trailing edge-forming photocell PEC-3 (FIG. 6).

The web passing around the bottom of the roller 31 passes over idler rollers 38 and 40. As the web leaves roller 38, it passes between a light source unit PEC-6 which may be multiple infrared LED screen strobed at a high frequency, and a light detecting sensor unit PEC-6'. The light source unit PEC-6 generates a light beam through the web leaving the roller 38. The light beam passes through the partially light transparent web and strikes the light detecting unit PEC-6'. The web wound on the reels 12A and 12A' frequently has a dark splicing tape securing together sections of the web. When the light striking the sensor unit PEC-6' is reduced by this tape, the equipment being described operates in a stacker bypass mode where the strip cut from the web containing the red splicing tape is not stacked in the stacking chamber, to avoid producing a defective honeycomb panel. The units PEC-6 and PEC-6' may be purchased from Banner Engineering in Minneapolis, Minn. under model No. LS-10.

The web leaving the light source and sensor units PEC-6 and PEC-6' passes by trailing edge-detecting sensor unit PEC-3 which generates a control signal when a trailing edge of a web passes thereby. This signal will stop the operation of the equipment and will sound an audible alarm, alerting the operator that the web on an unused reel should be unwound and spliced to the trailing edge of the web which operated the sensor unit PEC-3. The splice here used will be of sufficient thickness to actuate a splicing thickness sensor TS-1' located adjacent to the next roller 40.

If the splicing tape is a thick splicing tape or a splicing thread which thickens the spliced web at this point, the sensor TS-1' will operate the equipment in a stacker bypass mode to avoid stacking the strip containing the splice involved.

The web leaving the idler roller 40 passes down and then around a pair of horizontally spaced idler rollers 41–43 carried on a frame or housing 45. The rollers 41–43 and frame 45 and associated electrical and other apparatus are commercially available web aligning apparatus which will fix the alignment of the web. This web aligning equipment can be purchased from the Fife Corporation, 222 West Memorial Road, P.O. Box 26508 of Oklahoma City, Okla. 73126. It includes a processor having Model No. CSP-0106, infrared sensors under Model No. GSE-4, a servo transceiver unit under Model No. 1SCT-03 and an Offset Pivot Guide under Model No. SYMAT-25. It includes a frame or housing 45 mounted for rotation about a vertical axis so that the web can be aligned along a fixed longitudinal line.

The rotated position of the frame 45 is controlled by a pair of these sensors PEC-5 and PEC-5' laterally adjustable and spaced as shown in FIG. 5 which sense the opposite edges of the strip. As long as the light beams from both sensors are equally interrupted by these edges, the web is properly aligned. If the light beams of the sensor units become unequally interrupted, a control signal is generated which is fed to the servo transducer unit which, in turn, rotates the frame 45 about a vertical axis to equalize such interruption. The frame 45 carries the Offset Pivot Guide and the servo transducer unit referred to above which together with the processor referred to obtain this result. The rotation of the frame 45 creates tension in the web which causes it to move axially on an idler roller 44 over which the web passes after it leaves the roller 43.

Unless otherwise stated, the rollers 31, 36, 38, 40 and 44, as well as other rollers to be described, are freely rotatable cantilevered idler rollers. By cantilevered is meant that the rollers project from their support structures so that the web rides freely thereon without any guide wall on their outer ends which constrains the lateral position thereof. There is thus no need to thread the web between flanges or walls. However, rollers 41–43 are mounted between flanges so that the web must be threaded around these rollers.

As shown in FIGS. 4A and 6, the reel support structure, and the tension control and web aligning means are supported on a frame structure 26A which is separate from the frame structures 26B, 26C, 26D, 26E and 26F on which the folding means, adhesive applying means, cutting means and other apparatus are separately supported. With this modular construction, the repair or replacement of various portions of the equipment can be more conveniently accomplished.

Figure 6A:
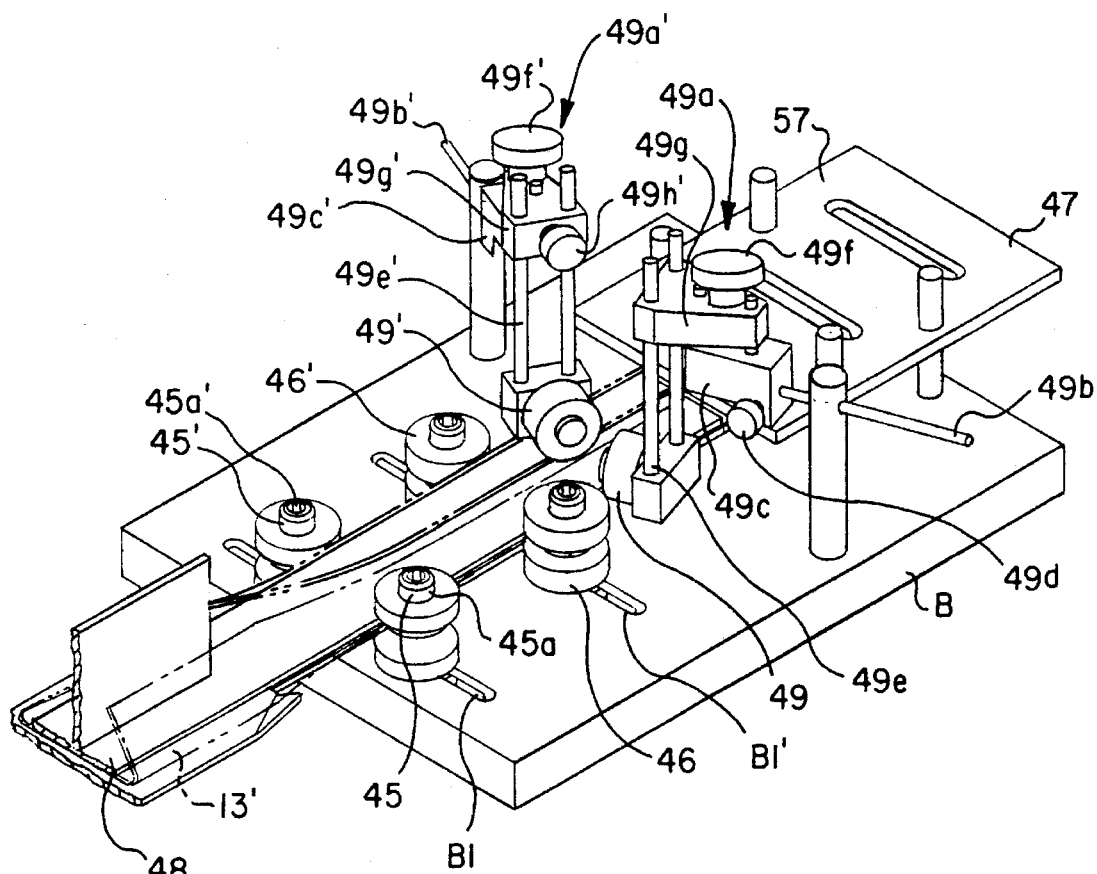
FIG. 6A is a perspective view of the folding apparatus used in the preferred form of the present invention to fold over the longitudinal edges of the web and which is located following the portion of the invention shown in FIGS. 5 and 6.

Folding Means 14 (FIG. 6A)

Figure 7:
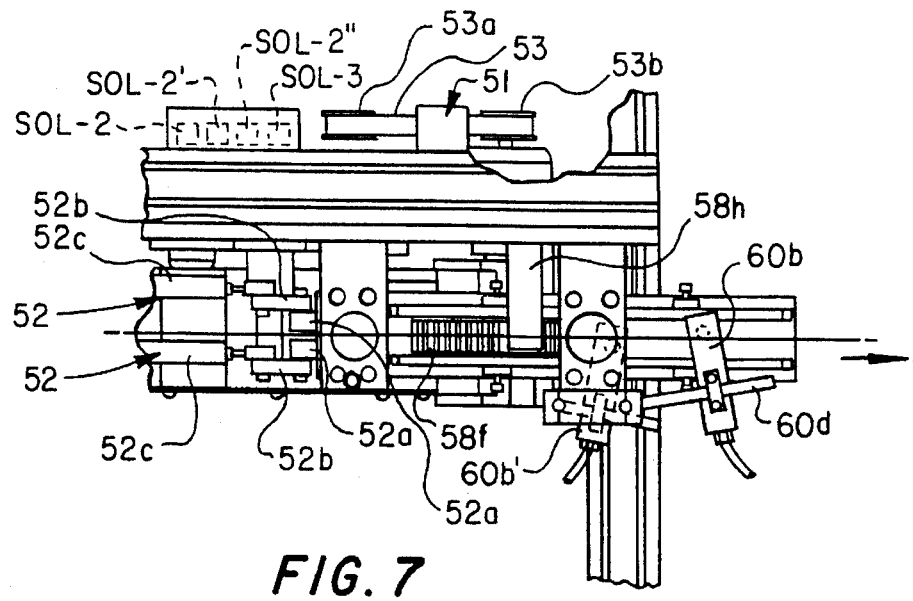
FIG. 7 is a top plan view of the portion of the apparatus shown in FIGS. 4A and 4B which includes a heating drum, pressure rollers which press the previously folded web upon the heating drum, a cooling table following the heated drum and adhesive applicator apparatus which applies adhesive to the folded web passing over the cooling table.
Figure 8:
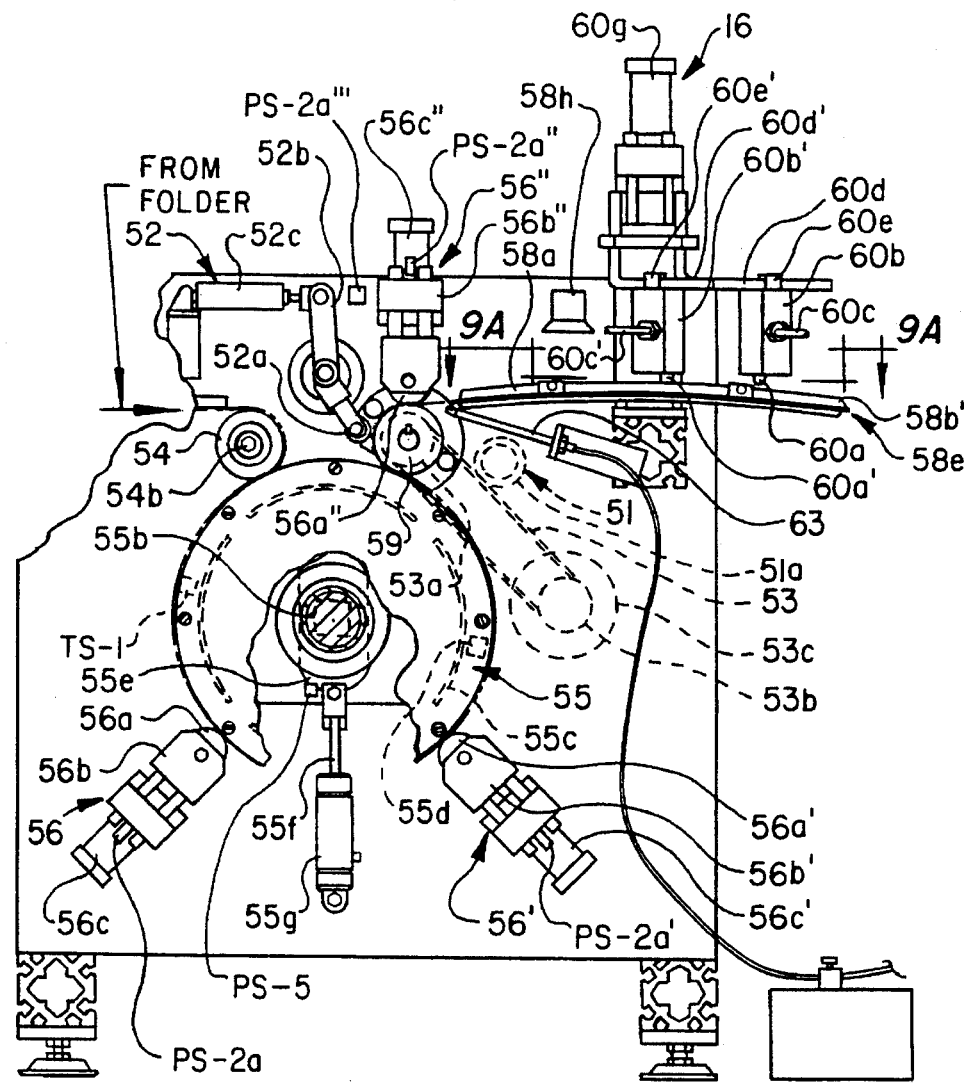
FIG. 8 is a front elevational view of the apparatus shown in FIG. 7.

The folding means 14 can be any suitable folding means utilized in the prior art. However, as illustrated in FIG. 6A, the folding station includes first and second pairs of folding rollers 45—45' and 46—46' mounted for rotation about vertical axes and presenting confronting tapered grooves within which the longitudinal edge portions of the web extend to produce opposite longitudinal folds in the web. The tapering of the confronting grooves of the first pair of rollers 45—45' are less steep than that of the confronting grooves in the second pair of rollers 46—46', so that the edges of the web are progressively folded around a vertically thin, folding plate 48. The plate 48 extends between the confronting pairs of grooves formed by the rollers 45—45' and 46—46'. The folding plate 48 has rounded edges so that they do not dig into the web material to form a crease therein. The folding operation is completed to form a tight fold by a pair of canted rollers 49—49' which press the folded over edge portions of the web upon the top of the folding plate 48. The web then passes beneath a plate 47 which holds the folds in their tightly folded condition until it passes around an idler roller 54 (FIGS. 7 and 8).

To enable the equipment to fold webs of different widths, the various pairs of rollers 45—45', 46—46' and 49—49' are supported for lateral adjustment on a support base B. The base has slots B1'—B1' through which pass bolts 45a—45a' which are anchored by respective nuts (not shown) beneath the base B. By loosening the nuts, the spacing of the roller pairs 45—45' and 46—46' can be adjusted for folded webs of a given desired width. As the web width varies, the width of the folding plate 48 is likewise varied to accommodate the desired width of the folded web.

The canted rollers 49—49' are supported on an adjustable superstructure 49a—49a' which includes horizontal extending rods 49b—49b'. Slidable on these rods are roller support heads like head 49c. These heads have locking screws like screw 49d extending therefrom which lock the horizontal adjustment involved. The vertical position of the rollers 49—49' can be adjusted in any suitable way. As shown, the rollers are carried on vertical rods 49e—49e' slidable in gear-containing housings like 49g—49g'. The vertical elevation of the rollers 45—45' on these rods are roughly and finely adjusted in elevation by adjusting screws like 49f—49f, and 49h'.

Fold Setting Apparatus

Referring now to FIGS. 4A, 7 and 8, the folded web passing around the idler roller 54 extends around a heated drum 55 carried on a freely rotatable shaft 55b (FIG. 8.)

The drum 55 is part of an assembly which includes electrical heating elements which heat the peripheral surface of the drum to a desired temperature using suitable temperature control apparatus. This control apparatus includes a thermocouple 55d which is electrically connected to suitable control equipment well known in the art. The drum also includes what is referred to as an over-temperature snap switch TS-1 which operates when the drum temperature exceeds a limited temperature such as 400° F. When this switch is operated, a control function is carried out which shuts down the entire system being described and sounds an audible alarm.

The drum assembly is supported by a support structure 55e for movement between a dormant lowered position (not shown) and an active raised position shown where it will press the web against the idler roller 54 and a drive roller 59. The raised position of the drum is sensed by a proximity switch PS-5. The drum support structure 55e is moved up and down by its attachment to a piston 55f of a solenoid valve controlled pneumatic unit 55g. When the equipment is placed into operation, the latter solenoid valve is energized to cause the pneumatic unit 55g to raise the drum from its lowered position to its raised position. The roller 59 is driven by a belt 53 extending between a pulley wheel 53a carried on the shaft 54b and a driven pulley wheel 53b driven by a motor 53c. The linear speed of the belt 53 measures the linear speed of the web moving around the surface of the drum 55.

The operation of the cutting means 18 (FIG. 3) is determined by the mount in a cutter control counter which receives count pulses from a pulse generator 51 (FIG. 8) which includes a rotatable element 51a contacting the belt 53 so as to be rotated by the belt movement. The number of pulses generated by the pulse generator 51 is thus directly related with the degree of movement of the web through the portion of the equipment being described and including the cutting means to be hereafter described.

When the web is advanced a distance equal to a desired strip length, the cutter control counter reaches a maximum count and a cut signal is generated which operates the cutter apparatus in a manner to be described. The cutter control counter is then reset to zero to start a new cutting cycle. If the equipment is in a stacking mode, then a stacking mode counter accumulates a count unless the strip to be cut is a strip with a splice or is one of two strips following the splice-containing strip. Thus, when a web section is detected having a splice, the strip which is ultimately cut from the web containing that splice and the two strips following it are not stacked. The reason that a total of three strips are here involved is because experience has shown that the initial portion of a roll of web material obtained from the web supplier are frequently defective and so it was found desirable to automatically throw away three strip lengths when the first of these strips contain a splice.

The web is also pressed against the surface of the drum 55 by extendable and retractable pressure rollers 56a and 56a' forming part of pressure roller assemblies 56 and 56'. The pressure rollers 56a and 56a' are carried by support structures 56b and 56b' secured to the pistons of solenoid valve controlled pneumatic units 56c and 56c'. When the solenoid controlling this valve is energized, the pneumatic units operate to press the web against the drum 55a. Proximity switches PS-2a and PS-2a' are provided which detects the extended or retracted position of the associated pressure rollers 56a and 56a'.

As the web leaves the bottom of the driven roller 59, it passes between a pair of narrow pinch rollers 52a—52a and the driven roller 59. The pinch rollers 52a—52a form part of a pair of roller assemblies 52—52. The pinch rollers 52a—52a are carried on support structures 52b—52b movable between extended and retracted positions by pneumatic units 52c–52c. The narrow pinch rollers 52a—52a are mounted for lateral adjustment so they can be aligned with the side margins of the folded web where they contact the folded over portions of the web. In the case of the exemplary folded web which in its folded condition has a width of 1.125 inches, the width of each of the pinch rollers is preferably 0.75 inches so each engages only a portion of the width of each folded web. In contrast, the width of each pressure roller 56a and 56a' and the pressure roller 56a" to be described is at least as wide as the widest folded web to be received by the equipment, so pressure is applied thereto over the entire width of the web.

The pinch force of the rollers 52a—52a is adjusted to be approximately the same force applied by the pressure rollers 56a and 56a' against the web passing over the drum 55b. The exact pressure applied by each of the rollers 52a—52a, as well as the other rollers, is adjusted by trial and error to assure the production of a folded web with flat, even folds. The roller assemblies 52—52 have proximity switches like PS-2a'"—PS-2a" (FIG. 8) which detect the retracted or extended positions of the associated pinch rollers.

The web leaving the pinch rollers 52a—52a passes between the driven roller 59 and a pressure roller 56a" of a pressure roller assembly 56" identical to the other pressure roller assemblies 56 and 56'.

The roller 56a" is supported by support structure 56b", connected to the piston of a solenoid valved controlled pneumatic unit 56c". When the solenoid controlling the pneumatic unit 56c" is energized, it lowers the roller 56a" to press the web against the driven roller 59. There is a proximity switch PS-2a" which detects the extended or retracted position of the pressure roller 56a". As the driven roller 59 is driven, the web and the rotatable drum 55 move as a unit.

When any of the proximity switches PS-2a, PS-2a' or PS-2a" indicates the retracted position of the associated roller, the control means 25 (FIG. 3) prevents operation of all operating elements of the equipment illustrated in the drawings.

The pneumatic units 56b, 56b' and 56b" which move the pressure rollers 56a, 56a' and 56a" between retracted and extended positions are controlled by solenoid operated valves SOL-2, SOL-2' and SOL-2" (see FIG. 7). The pneumatic unit 52c is similarly controlled by a solenoid operated valve (not shown). The movement of the drum 55 between its lowered and raised positions is controlled by a solenoid operated valve SOL-3 also shown in FIG. 7. The pneumatic units 52c—52c are similarly controlled by solenoid operated valves, not shown.

The pressing of the web against a surface heated to a temperature which is at or above what is called the annealing temperature of the web material will set the fold made therein by the folding apparatus, as is well known for many years in the prior art formation of pleats in zig-zag and honeycomb polyester panel materials. It has also been well known for many years that to decrease the setting times over ambient air cooling the folded panel is subjected to a cooled environment as it is held in its desired folded state. U.S. Pat. No. 3,281,516 to Southwich discloses the application of pressure and heat to a thermoplastic material, followed by cooling, to permanently fix a folded contour in thermoplastic materials. A preferred condition for setting the previously described No. 5040 Ashai folded web material:

Drum surface temperature 370° F.

Contact time of web on drum surface 0.80 seconds.

The resultant normal force applied to web by each of the rollers 56a, 56a' — 55 pounds.

The web materials which can be handled by the equipment being described can have various thicknesses. Since it takes a longer time to heat a thicker web than a thinner one, when one changes from a web of one thickness to another, assuming the basic material stays constant, the web speed is generally increased in inverse proportion to the thickness of the material. Also, instead of just varying the web speed, one can also vary the temperature of the drum surface. Thus, if a web of increased thickness is to be folded and set, the web speed can be decreased and the drum surface temperature can be increased somewhat if desired to obtain the best results. The temperature to which the material is heated is the important objective. That temperature must be below the melting temperature of the material and high enough to form a set fold.

To facilitate the cooling of the web moving to a cooling table assembly 58, a misting unit 63 may be used to spray a mist of moisture onto the web as it enters the cooling table assembly 58. This misting unit may be Model No. 100N available from Kool Mist Corporation of Santa Fe Springs, Calif.

The cooling table assembly 58 has an upwardly curved top surface 58a over which the heat set web passes and is stretched by the pulling tension on the web. It is laterally guided over this surface by laterally adjustable guide walls 58b—58b' (FIG. 9A). The position of these guide walls is adjustable by screws 58i and lockable in position in any suitable way, such as by bolts or screws 58c passing through these walls and elongated slots 58d formed in a wall forming the cooling table 58a, as shown in FIG. 9A. The cooling table surface 58a is cooled in any suitable way, such as by one or more cooling coils 58e.

The cooling table assembly is preferably a structure not shown in the drawings. It includes the upper surface of an aluminum block with cooling fins on the bottom surface thereof. The bottom of the block is located in a cooling chamber through which a coolant fluid passes. In this form of the invention, the block can be 18" long, 4" wide and 2" high. The cooling fins project ¼" below the block. There are two such fins 18" long, ⅛" wide and ¼" deep.

The web is both pushed by the driven roller 59 onto the cooling table surface 58a and pulled over the table under additional tension by a driven roller to be described. This additional driven roller is located just ahead of the cutting means to be described.

When the web material is the exemplary No. 5040 Ashai material previously described, the temperature of the surface of the cooling table is preferably 40° F. where the web moves at a speed of 250 feet per minute and is pulled and stretched upon the curved cooling table surface. In a commercial form of the invention, the cooling table had an overall length of 18.25" over which substantially the entire length of which the web is stretched. The cooling table surface has a 2" long recess or opening 58a-1 centered on the peak of the table and above which an adhesive-applying head 60b with a pair of discharge ports 60a—60a' is supported. This table opening enables adhesive flowing or dripping from the adhesive-applying means in the absence of a web to be collected by a container (not shown) placed below the recesses. Also, this opening provides for a more consistent deposit of adhesive by providing a space into which the web can deform slightly as it receives the adhesive on the top thereof. Slight irregularities in the table surface will not affect the width and thickness of the adhesive deposit.

Since it is desired that the web speeds be substantial for mass production reasons, it is advantageous to use in addition to the cooling of the cooling table surface 58a and the mister unit 63 added means for cooling the web surface. To this end, a heat dissipation block 58f having cooling fins 58f' at the top thereof best shown in FIG. 9D. This block rides upon the full width of the cooling table surface 58a. The exemplary block has a width of 6", a height of ½" and a length along the longitudinal axis of the table of 6". Also, the cooling fins 58f' have a width of ¼" and a height of ¼. The block 58f is kept from moving along with the web 131 pulled over the cooling table surface by an abutment pin 58g. A blower 58h blows room temperature air onto the cooling fins 58f'.

For various reasons including the saving of space, the adhesive applying means 16 is mounted above the cooling table surface 58a. It includes a pair of adhesive applicator heads 60b13 60b' having a pair of adhesive discharge ports like 60a' (FIG. 9C) located during adhesive application to be just above the surface of the web 13' passing below. As previously indicated, it is very important that the correct amount of adhesive is discharged from the ports to provide both a desired thickness of adhesive and an adhesive band which is substantially perfectly parallel to the folded over edges of the web. To this end, the commercially obtained adhesive applying apparatus which had conventional circular discharge ports was modified so as to be rectangular in shape, as shown in FIG. 9C. In the case of the exemplary No. 5040 Ashai web material previously disclosed, each discharge port had a length of 4.015" in the direction of web movement and a width of 5.060". When the discharge pressure applied to the adhesive was 30 bars, this deposited an ideal adhesive band of 0.005" thick.

The temperature of the glue and the dispensing thereof are controlled in a well known manner. The entire glue applicator system including the glue applicator heads and the temperature controls therefor are commercial units sold by Nordson Corporation of 6755 Jimmy Carter Boulevard, Norcross, Ga. 30071 under the model designation PUR204. The desired glue temperature, of course, depends upon the particular adhesive which is used. As previously indicated, the preferred adhesive is obtained from H.B. Fuller Company under order No. NP 2028. For this adhesive, the desired glue temperature when discharged onto the web is 115° F.

The most preferred adhesive applying means is a modification of that just described. Instead of utilizing separate heads 60b13 60b' a single head (not shown) with two rectangular discharge ports laterally spaced the same distance as the ports 60a— 60a'. The single head is mounted and lockable in any desired lateral position on a single laterally extending rod to deposit the spaced bands of adhesive at the desired positions on the web.

When the web leaves the cooling table 58a, it passes between a bottom driven roller 62 operating at a peripheral speed of 250 feet per minute and a pressure idler roller 61a of a pressure roller assembly 61 (FIG. 11). The pressure roller 61a is supported on a frame 61b movable between raised and lowered positions by a suitable pneumatic unit 61c. The rollers 61a and 62 have grooves 61a' and 62' (FIG. 12) to clear the adhesive beads applied to the web. The pneumatic unit 61c is controlled by a suitable solenoid controlled valve unit SOL-4 (FIG. 11). An exemplary pressure between the pressure roller 61a and the web riding on the idler roller 62 below is 5 pounds. A proximity switch PS-4 detects the retracted, raised position of the pressure roller 61a. The proximity switch PS-4 then operates to stop or prevent operation of the equipment, as in the case of the other pressure roller associated proximity switches previously described.

Also shown in FIG. 11 is a solenoid controlled value unit SOL-5 which controls feeding of pneumatic pressure to the misting unit 63, and a solenoid controlled valve unit SOL-6 which controls the pneumatic unit 60c to control the up and down movement of the glue applicator head 60b.

Description of Cutting Means 18

The web leaving the pressure roller 61a and the idler roller 62 passes between a cutting blade carrying wheel 64 (FIG. 11) and a continuous driven roller 68. The roller 68 is driven by a suitable motor 69 at a slightly higher (for example, a 5% higher) peripheral speed than the driven roller 59 mounted above the drum 55a.

For a better description of the cutting apparatus, reference should now be made to FIGS. 12, 13, 14 and 14A. The cutting blade carrying wheel 64 has a slot 64' which straddles the portion of the web containing the bands of adhesive. It carries a cutting blade 65 with a rounded edge. When the cutting blade 65 is rotated opposite the driven roller 68, it just barely wipes on the surface thereof. The rounded edge of the blade 65 moves at about the same speed as the peripheral speed of the driven roller 68 and it bites or crushes through the web material cleanly.

The cutting blade carrying wheel 64 is secured to a shaft 66 which in turn connects to the output shaft of a clutch and control unit 67. This clutch is preferably one sold by the Warner Corporation of 449 Gardner Street, South Beloit, Ill. 61086 under model No. CB-6, CW, 24VDC, ¾". The input shaft 68 to this Warner clutch may be continuously driven by a separate motor or, as illustrated, by gears 69 and 70, in turn, driven by a motor driven belt 71 which also drives the shaft on which the driven roller 68 is mounted. When the clutch unit 67 received an input signal, it unlocks its output shaft and rotates the same 360° and then again locks the output shaft in place. The cutting blade 65 is shown in FIG. 11 at an initial locked position just in advance of the driven roller 68. The timing of this input signal is determined by a software pulse counter which counts control pulses generated by the drive motor which advances the web to the cutting means. When the counter reaches a maximum count which indicates that the web has been moved a given distance corresponding to the desired length of the strip to be cut from the web, this control signal is generated to unlock the output shaft of the clutch unit to rotate the blade 65 one resolution to cause the blade 65 to cut through the web.

High Speed Conveyor System and Stacking Apparatus

Referring now more particularly to FIGS. 15 and 16, the strip discharged from the cutting means 18 is pushed by driven roller 68 onto the inlet end of the first high speed conveyor 20A. The conveyor 20A includes an endless conveyor belt 80 having apertures throughout its length through which suction is drawn. The conveyor belt 80 may have a chain-like configuration with the apertures defined between the links of the chain. The endless belt 80 passes over a sprocket wheel 82 at its inlet end and a drive sprocket wheel 83 at its opposite end (FIG. 18). The sprocket wheel 83 is connected to a shaft 83' which is attached to a belt pulley wheel 84a driven by a belt 84b. The belt 84b is driven by a drive pulley 84c driven by a motor 87.

The strips entering the inlet end of the high speed conveyor 20A are guided by laterally adjustable converging guide walls 86—86' (FIG. 15) which diverge to where they are spaced apart a distance equal to the width of the strips of material involved.

The upper section 80a of the endless conveyor belt 80 is supplied with suction by means now to be described. A number of inlet suction tubes 88a extending from a suction pump (not shown) open onto the bottom of a horizontally extending suction conduit 92 (FIG. 17). The suction conduit 92 has a number of horizontally extending supports 96 communicating with a vertical chamber 98 extending the length of the conveyor. This vertical chamber 98 is defined between two spaced vertical walls 94—94'. The upper section 80a of the endless conveyor belt 80 slides in a groove defined between the upper portions of the walls 94—94' and the belt apertures open onto the top of the chamber 98 so that the suction pump will cause a suction pressure to hold the strips upon the top of the upper section 80a of the belt 80. The bottom section 80b of the endless conveyor belt extends within a groove defined between the lower ends of the walls 94—94'.

In one commercial form of the invention where the strips cut from the web were about 12 feet, the conveyor belt 80 formed a conveyor path about 18 feet long. The conveyor belt 80 in this embodiment of the invention moved about three times the exemplary 250 feet per minute at which the web was advanced to the cutting means 18. The belt 80 delivers the strip carried thereby to the inlet end of the second higher speed conveyor 20B desirably moving at a somewhat higher speed than the conveyor 20A. The conveyor 20B extends below and along the stacking chamber 22 which, if the strips are 12 feet long, form a conveyor path at least 12 feet long. It is in practice made much longer than 12 feet to form a discharge end. For example, where the strip length was 12 feet long, the conveyor 20B moved the web at a speed of 800 feet per minute and its path length was 14 feet long. These conveyor speeds accommodated a stacking cycle time of 4 seconds.

Figure 19A:
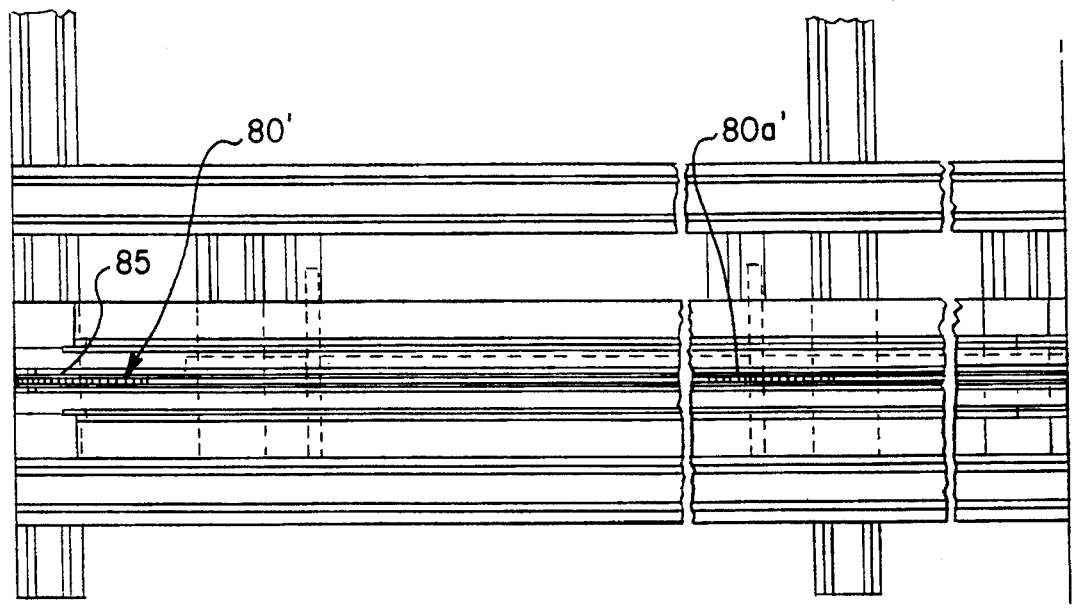
FIG. 19A is a broken away plan view of the portion of the apparatus shown in FIGS. 4A and 4B which includes a portion of the stacking chamber and the second conveyor which is raisable into the stacking chamber.
Figure 19B:
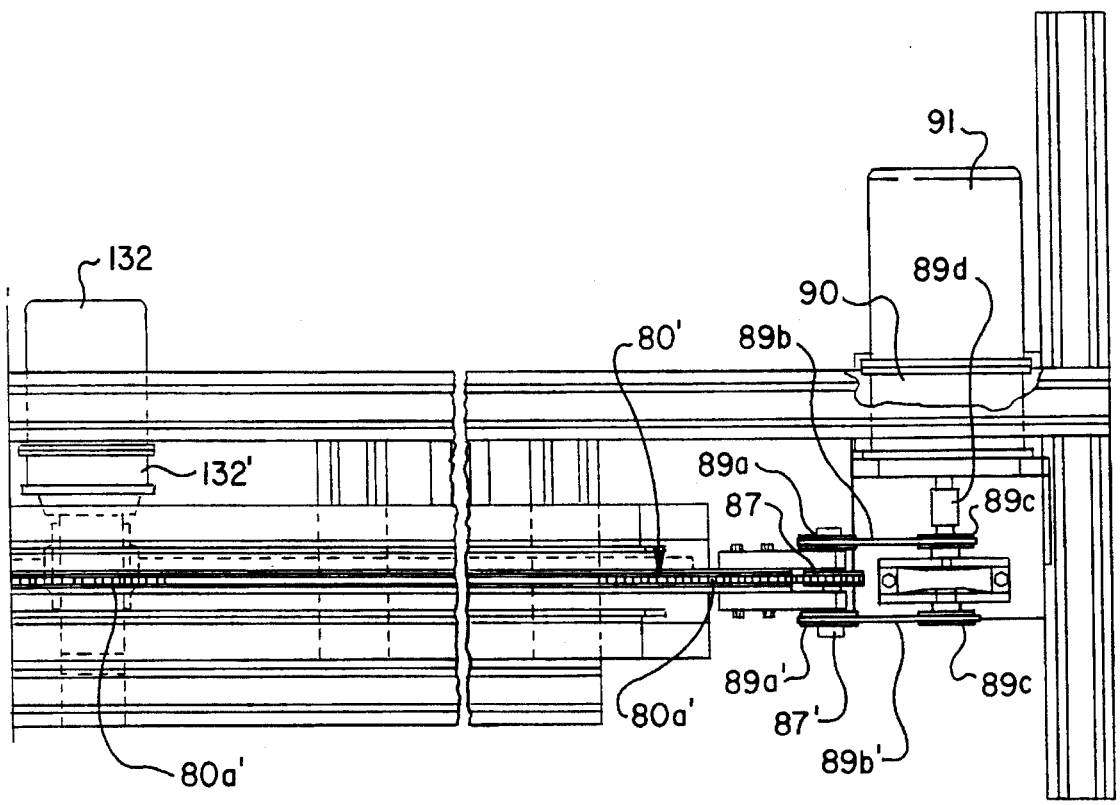
FIG. 19B is an extension of the apparatus shown in FIG. 19A and shows the remainder of the stacking chamber and second conveyor.
Figure 20A:
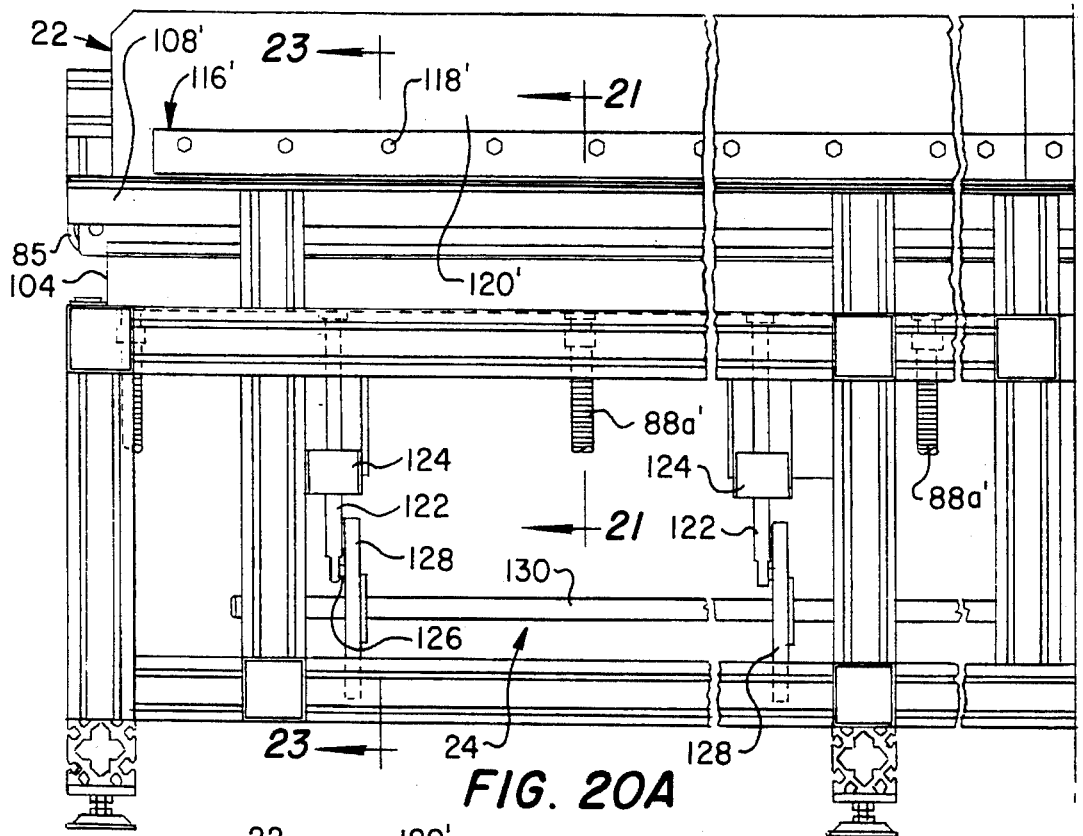
FIG. 20A is a front elevational view of the apparatus shown in plan view in FIG. 19A.
Figure 20B:
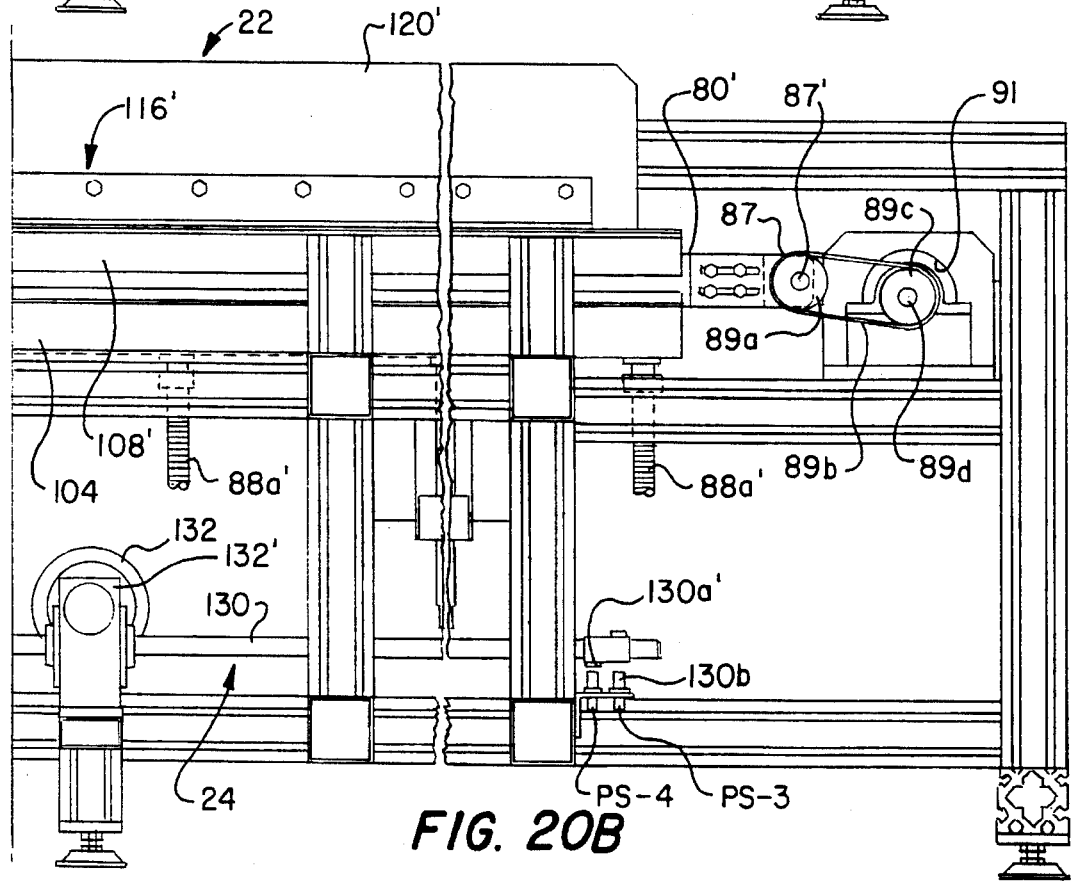
FIG. 20B is a front elevational view of the apparatus shown in plan view in FIG. 19B.

The conveyor 20B best shown in FIGS. 19B, 20A and 20B include an endless apertured conveyor belt 80' like the conveyor belt 80 previously described. This conveyor belt 80' passes around a sprocket wheel 85 at the inlet end of the conveyor 20B and around a drive sprocket wheel 87 at its outlet end. The sprocket wheel 87 is attached to a shaft 87'

(FIG. 19B) carrying a pulley wheels 89a— 89a', receiving belts 89b—89b' extending around driven pulley wheels 89c—89c. The pulley wheels 89c—89c are attached to a shaft 89d driven by a suitable motor 91 through a brake clutch 90 controlled by a brake solenoid. When the solenoid is energized it operates the brake clutch to lock the shaft 89d to stop the conveyor belt 80' when a strip to be stacked is in alignment with the stacking chamber pass-through slot previously described in the bottom of the stacking chamber 22.

The passage of the leading and trailing edges of a strip from the end of conveyer 20A to the inlet end of the conveyor 20B is sensed by a combination light source and light sensor unit PEC-7 so that as the trailing edge of a strip passes by this sensor a stack-initiating signal is generated which is used to initiate a stacking operation if the equipment is operating in a stacking mode and that strip is to be stacked. The stack-initiating signal effects energization of a solenoid controlling the brake clutch 90 to stop movement of the conveyor belt 80' after a suitable delay, for reasons previously explained, and initiate rotation of a cam shaft to be described. This rotation begins a stacking operation so that the strip will be fed into the stacking chamber in alignment with the other strips.

The high speed conveyor 20B is mounted on a support structure for movement between a lowered position where the upper section 80a' of the endless conveyor belt is below the bottom of the stacking chamber 22 to a raised position where it moves into the stacking chamber in a manner to be described.

Figure 21:
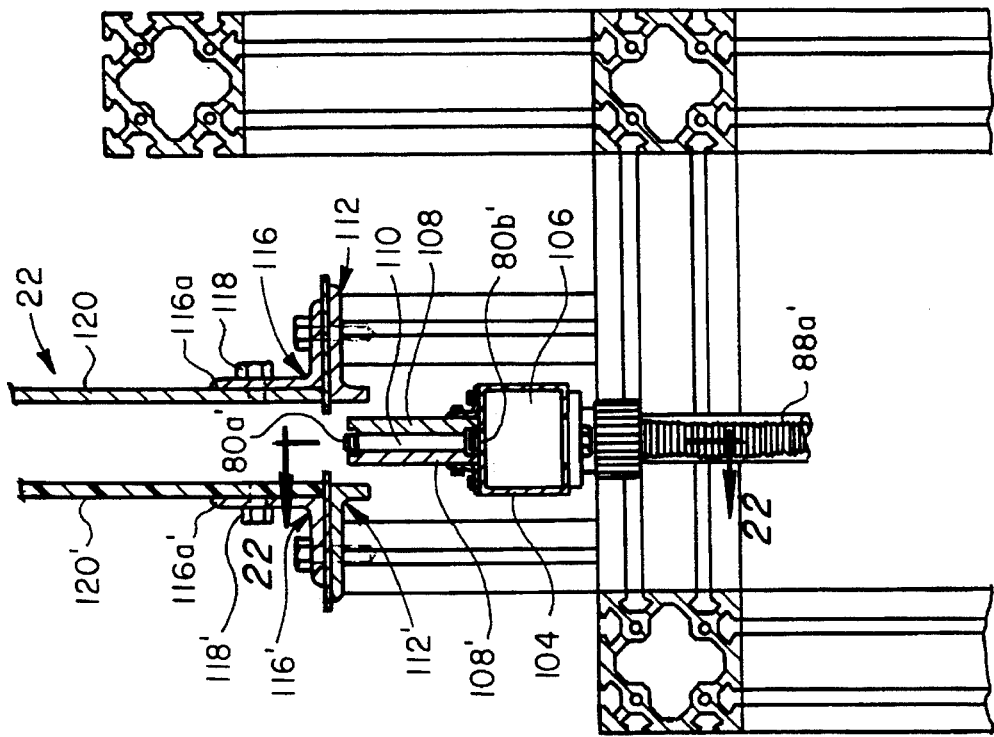
FIG. 21 is a vertical sectional view through the apparatus shown in FIG. 20A as seen in viewing plane 21—21 therein and shows the portions of the apparatus which deliver suction pressure to the upper section of the endless conveyor chain which delivers strips to the stacking chamber and portions of the stacking chamber and the endless conveyor chain of the second conveyor.

The high speed conveyor 20B includes a series of suction inlet tubes 88a' extending up into a horizontally extending conduit 104 (FIG. 21). The conduit 104 has a series of horizontally spaced ports 105 (FIG. 23A) in the top thereof connecting with a vertical chamber 110 above the same defined between a pair of horizontally spaced walls 108—108'. The upper section 80a' of the endless conveyor belt 80' rides in a recess defined by the confronting surfaces of the walls 108—108' so that the suction force present in the chamber 110 will draw a strip carried on the upper section 80a' of the endless conveyor belt 80' onto the top of the belt. The bottom section 80b' of the conveyor belt rides in a recess defined at the bottom ends of the walls 108— 108'.

Figure 24:
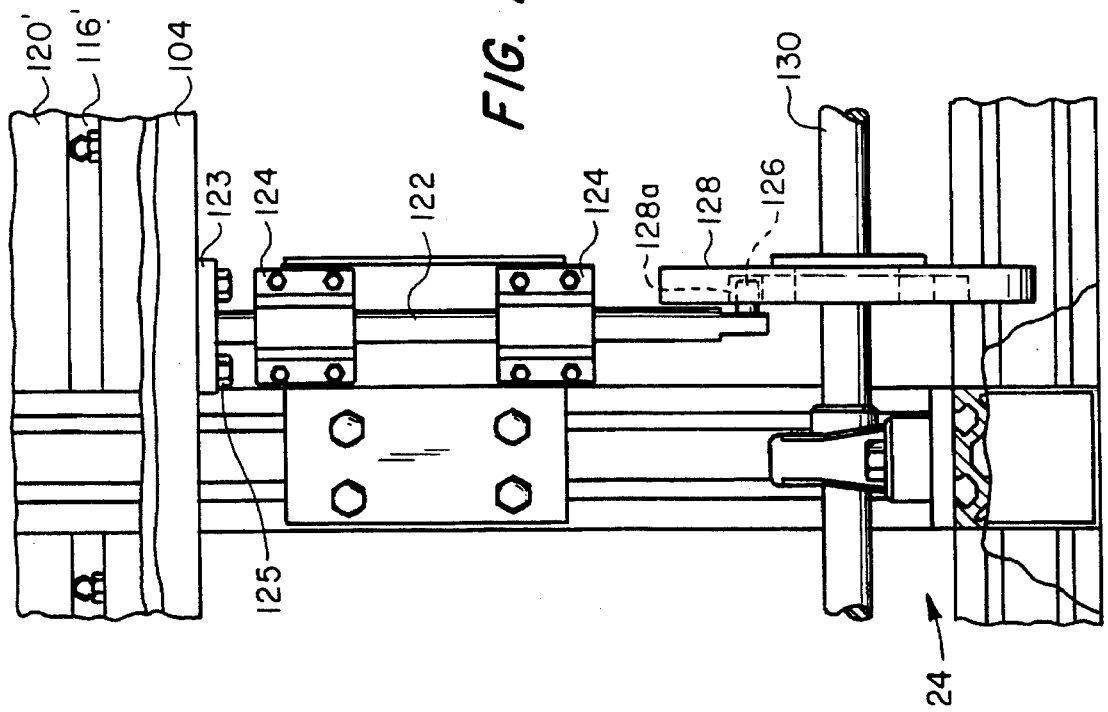
FIG. 24 is a front elevational view, partly broken away as seen in viewing plane 24—24 shown in FIG. 23.

Refer now to FIGS. 20A, 20B and 24 which best illustrate the structure for the high speed conveyor 20B which supports the conveyor for movement. Secured to the bottom of the suction conduit 104 are a series of vertical posts 122 guided for vertical movement in guide brackets 124—124 secured to a stationary portion of the support structure. At the bottom of each of the posts is a cam follower 126 which rides in a cam groove 128a (FIG. 24) in a cam wheel 128 secured to horizontal cam shaft 130. The cam shaft 130 carries a number of such cam wheels driven by a drive motor 132 through a suitable solenoid controlled clutch 132' (see FIG. 20B). In the program flow diagrams, the solenoid controlling the clutch 132' is referred to as the stacker solenoid.

As the cam shaft 130 rotates, the cam wheels 128 carried thereby rotate. The cam followers 126 at the bottoms of the various vertical posts 122 follow the contour of the cam slots 126 to cause the high speed conveyor structure to move up and down as described. The clutch 132' in one state thereof decouples the motor 132 from the cam shaft 130 and in the other state thereof couples the motor 132 to the cam shaft 130. When it is desired to bypass the stacking chamber, the stacker solenoid is operated into its state which operates the clutch to decouple the motor 132 from the cam shaft 130, so that the cam shaft remains in a position where the cam follower pins 126 are in the innermost portion of the cam wheel slots 128a. A proximity switch PS-3 shown in FIG. 20B, which responds to the movement of a cam shaft carried projection 130a' opposite thereto, operates to generate a control signal which, among other things, de-energizes the stacker solenoid to decouple the motor 132 from the cam shaft 130 upon completion of a stacking operation. When the cam shaft 130 is rotated 180° from this position the cam follower pins 126 are in the outermost portions of the cam wheel slots where the entire conveyor structure is in its uppermost position. A proximity switch PS-4 will be operated by a cam shaft projection 130b moved opposite thereto to indicate this raised condition of the conveyor. A control signal is then generated by switch PS-4 to effect control functions which are identified in the program flow chart of FIG. 25J.

When a stacking operation is called by the program, the stacker solenoid is energized to operate the clutch 132' to couple the drive shaft of motor 132 to the cam shaft 130.

Refer now to FIGS. 23A and 23B which discloses the stacking chamber construction and the manner in which each strip to be stacked is stacked in the stacking chamber 22 when a stacking operation is carried out. The stacking chamber 22 is defined between the vertical walls 120—120' spaced apart a distance greater than the width of the strips to be stacked therein. This spacing is adjustable to set up the stacking chamber to receive different strip widths. The walls 120—120' are anchored by screws 118— 118' to the upper legs 116b—116b' of spaced, confronting angle members 116—116'. The lower legs 116a—116a' of the angle members are anchored by bolts or screws 115—115' to a stationary support structure. The screws 115— 115' pass through slots in a pair of spaced, confronting angle members 112—112' and thread into this support structure. The slots permit adjustment of the spacing of the angle members 116—116'.

Sandwiched between the legs of the angle members 112—112' and 116—116' are pass-through slot-defining bars 117—117' which are spaced apart a distance less than the width of the strips to be stacked in the stacking chamber. These bars define a longitudinal pass-through slot 119 (FIG. 23B) extending the full length of the stacking chamber which is open at its outer ends. The separation distance of the bars 117—117' is, of course, laterally adjustable to accommodate different strip widths. This adjustability may be provided by slots in the bars through which the shanks of the screws 115—115' pass. A pass-through slot width of 0.875 inches was found suitable for the folded 1.125 inch wide exemplary No. 5040 Ashai strip material identified above. The spacing of the stacking chamber walls 120—120' was then adjusted to be 1.165 inches.

The slot 119 is centered below the stacking chamber 22. The defining walls of the slot-defining bars 117—117' form a floor at the bottom of the stacking chamber 22 and above which the strips stacked in the stacking chamber will rest, until they are raised by the force of the upper section of the conveyor belt 88a' rising up into the stacking chamber 22. Before any strips are fed into the stacking chamber, in accordance with one aspect of the invention, a weight bar 119 may be located in the stacking chamber, so that it will exert a downward force on any strips which are moved up into the stacking chamber.

As previously explained, when the trailing edge of a strip passes by the sensor unit PEC-7 located at the end of the first conveyor 20A, a signal is generated by the software which, when a stacking operation is desired, operates the solenoid controlling the brake clutch 90 (FIG. 19B). This operation locks the conveyor belt drive shaft and releases the clutch 132' associated with the cam shaft 130, so that the cam shaft is driven by the motor 132.

The rotation of the cam shaft 130 rotates the cam wheels 128 to raise the high speed conveyor 20B to a level where the upper section 80a' of the endless conveyor belt 80' will carry the strip involved up into the stacking chamber 22, as illustrated in FIG. 23A. The uppermost position of this conveyor belt section 80a' is shown by dashed lines in FIG. 23A. This strip and the strips immediately above the strip being pushed into the stacking chamber are raised so that the pressure exerted by the endless conveyor belt in a upward direction and the weight of the weight bar 119 in a downward direction will effect a good adhesive bond between the strips. Because the strip being fed into the stacking chamber is held in a perfectly horizontal position by the suction force on the upper section 80a' of the endless conveyor belt 80', the strip in an unwrinkled state is adhesively bonded to the strip above it.

As previously indicated, when the upper section 80a' of the endless conveyor chain is lowered below the pass-through slot 119, the bottommost strip just delivered to the stacking chamber remains in the stacking chamber as the belt moves downward through the slot.

Program Flow Diagrams of FIGS. 25A–25G

The program flow diagrams of FIGS. 25A–25G illustrate the manner in which the software used with the present invention responds to various sensor and manual switch conditions indicated therein. These flow diagrams are, for the most part, self-explanatory. They include, in addition to a description of the stacking mode of operation of the invention, other modes of operation used in setting up or testing the equipment shown, as well as a splice bypass mode when a splice is detected. It should be understood that where reference is made in these diagrams to setting a marker in memory to effect a given mode of operation this implies also that the marker previously set to obtain the opposite mode of operation is removed from memory automatically. Also, the various point-indicating letters appearing in these diagrams indicate common points to which the similar identified points of the various figures are connected to complete one overall program flow chart. Also, many of the questioned functions are determined by the operation of manual switches.

It should be further understood that the present invention is not limited to software control since hardware control elements can obviously be substituted for software indicated control elements.

Figure 23:
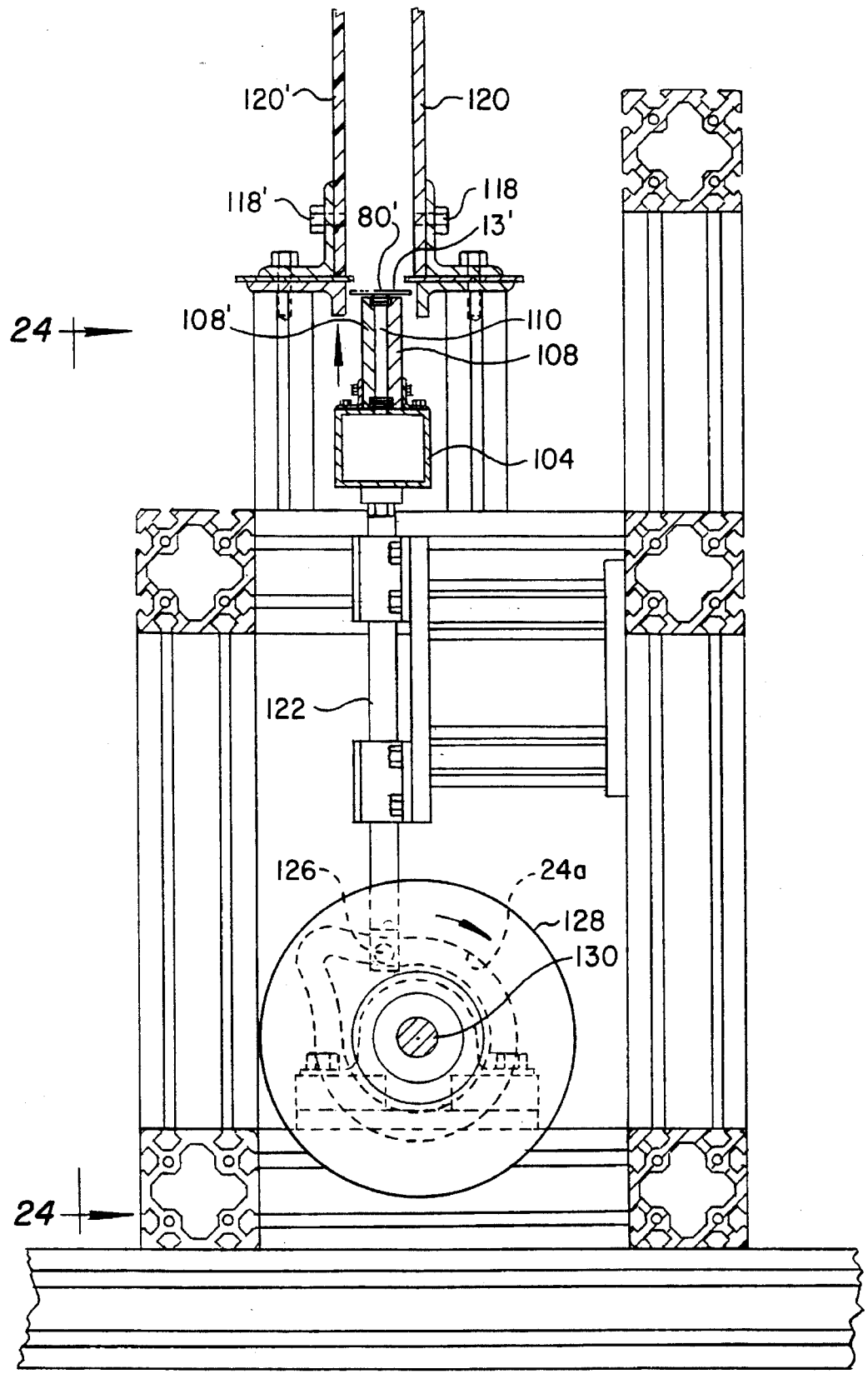
FIG. 23 is a vertical sectional view through the stacking chamber, second high conveyor and the conveyor lifting apparatus as seen in viewing plane 23—23 in FIG. 20A.
Figure 25A:
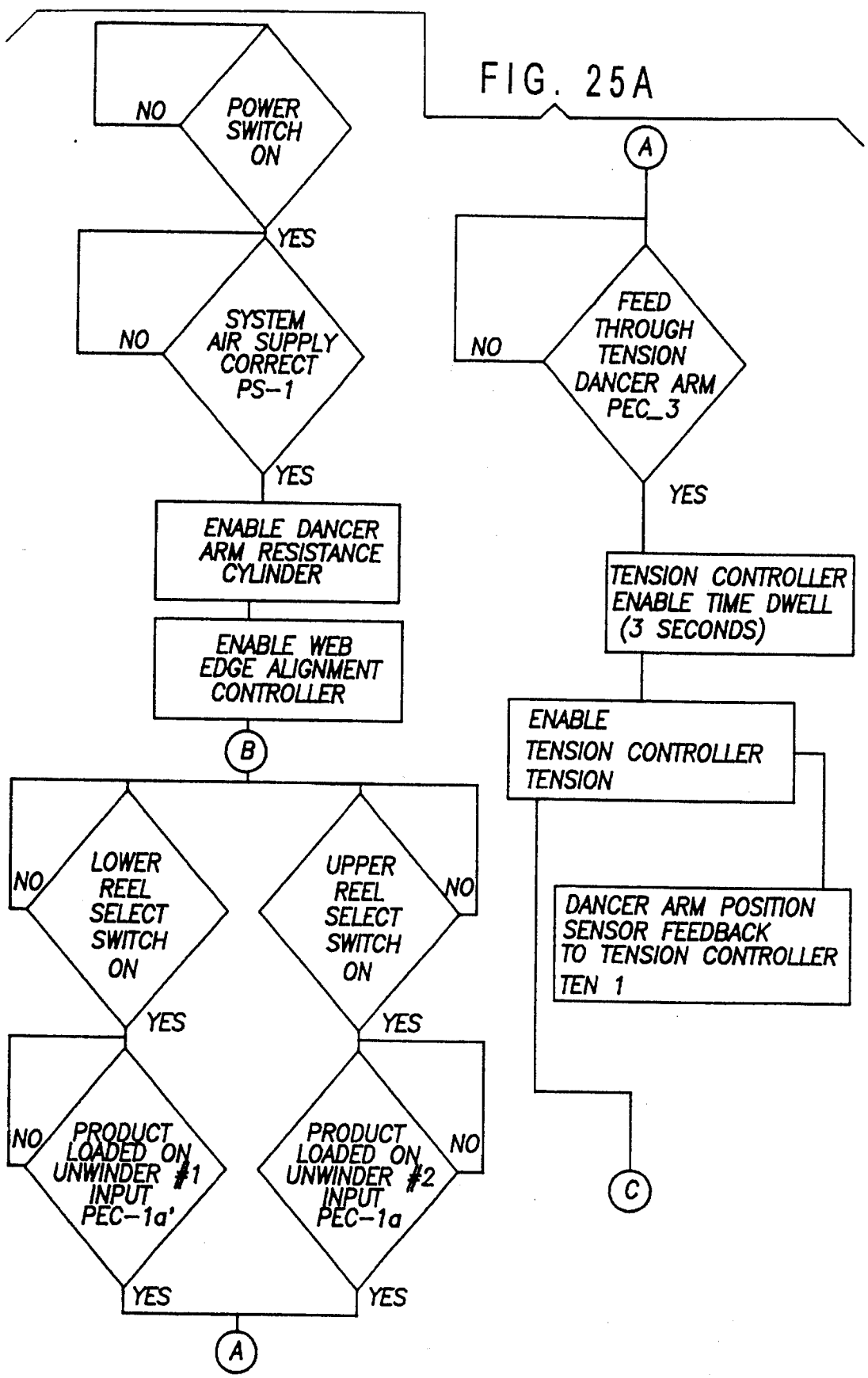
Figure 25B:
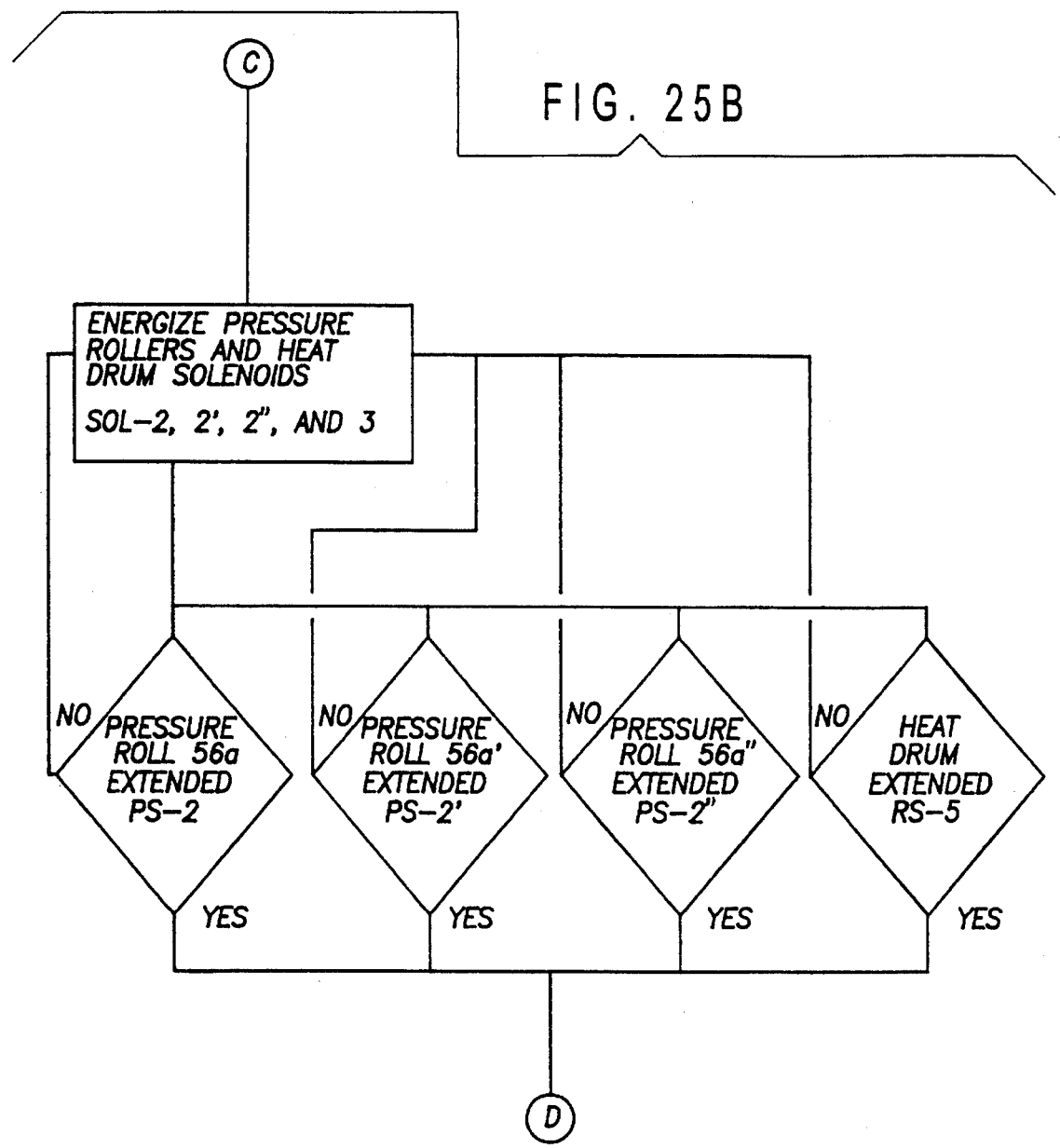
Figure 25D:
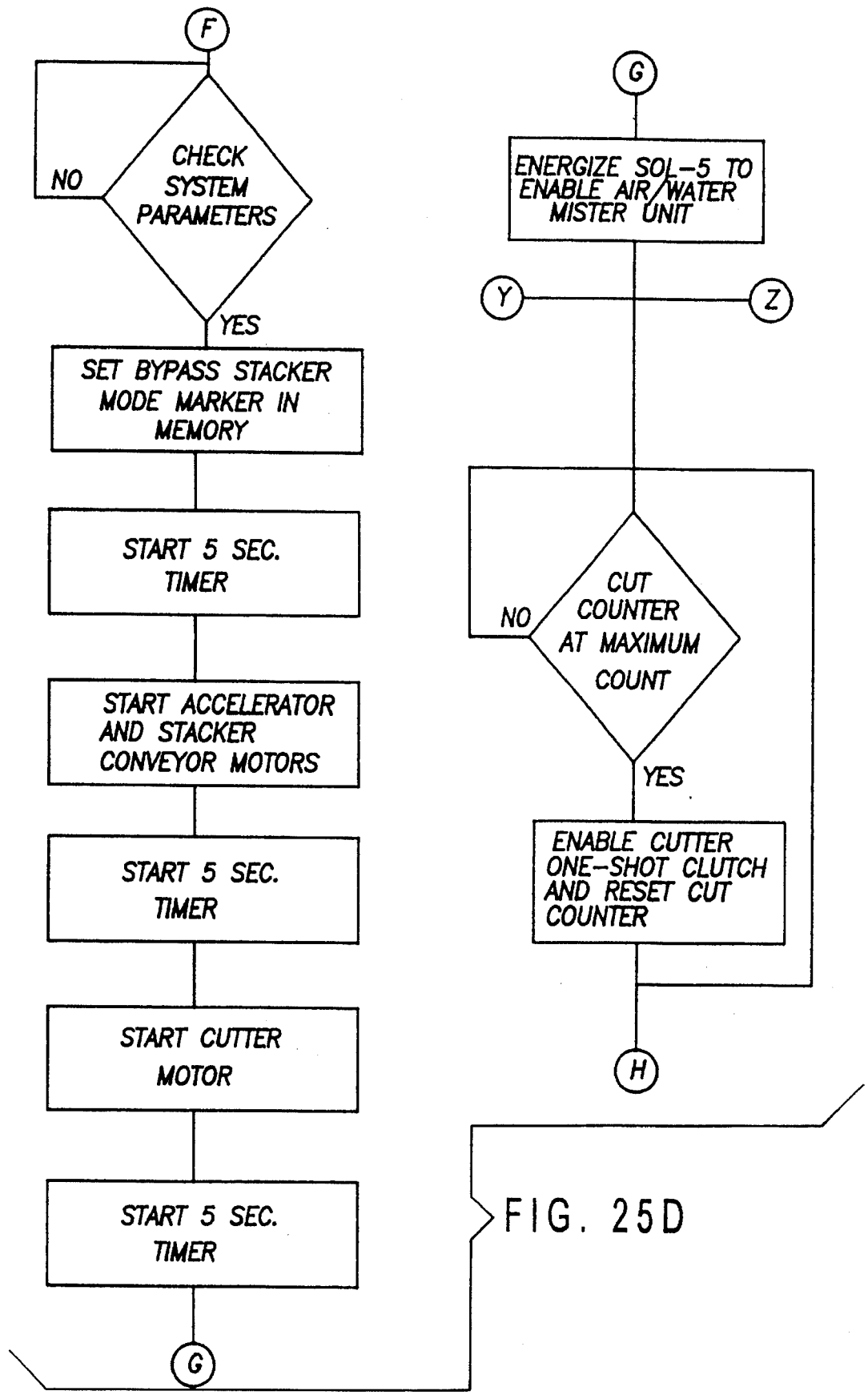
Figure 25E:
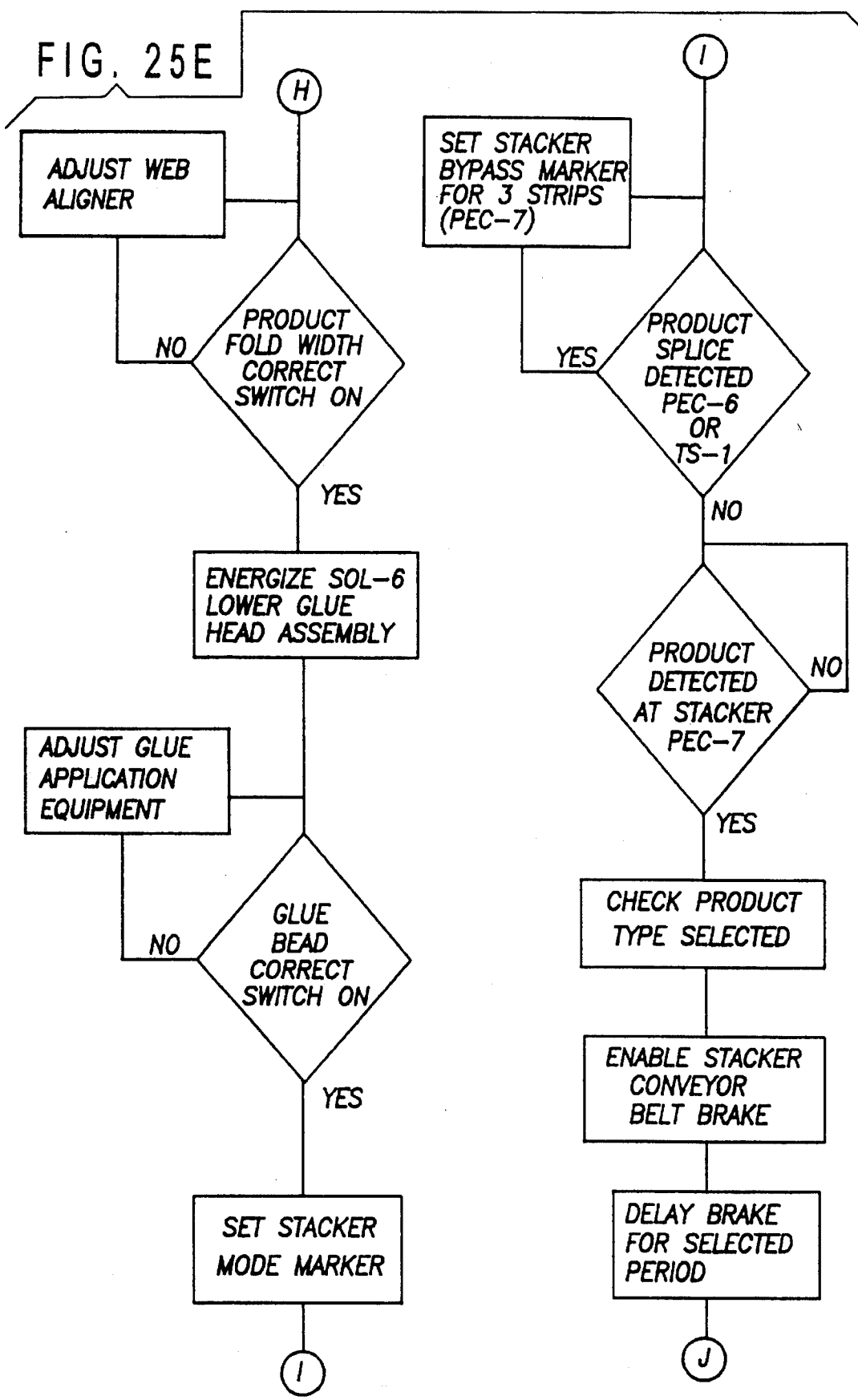
Figure 25F:
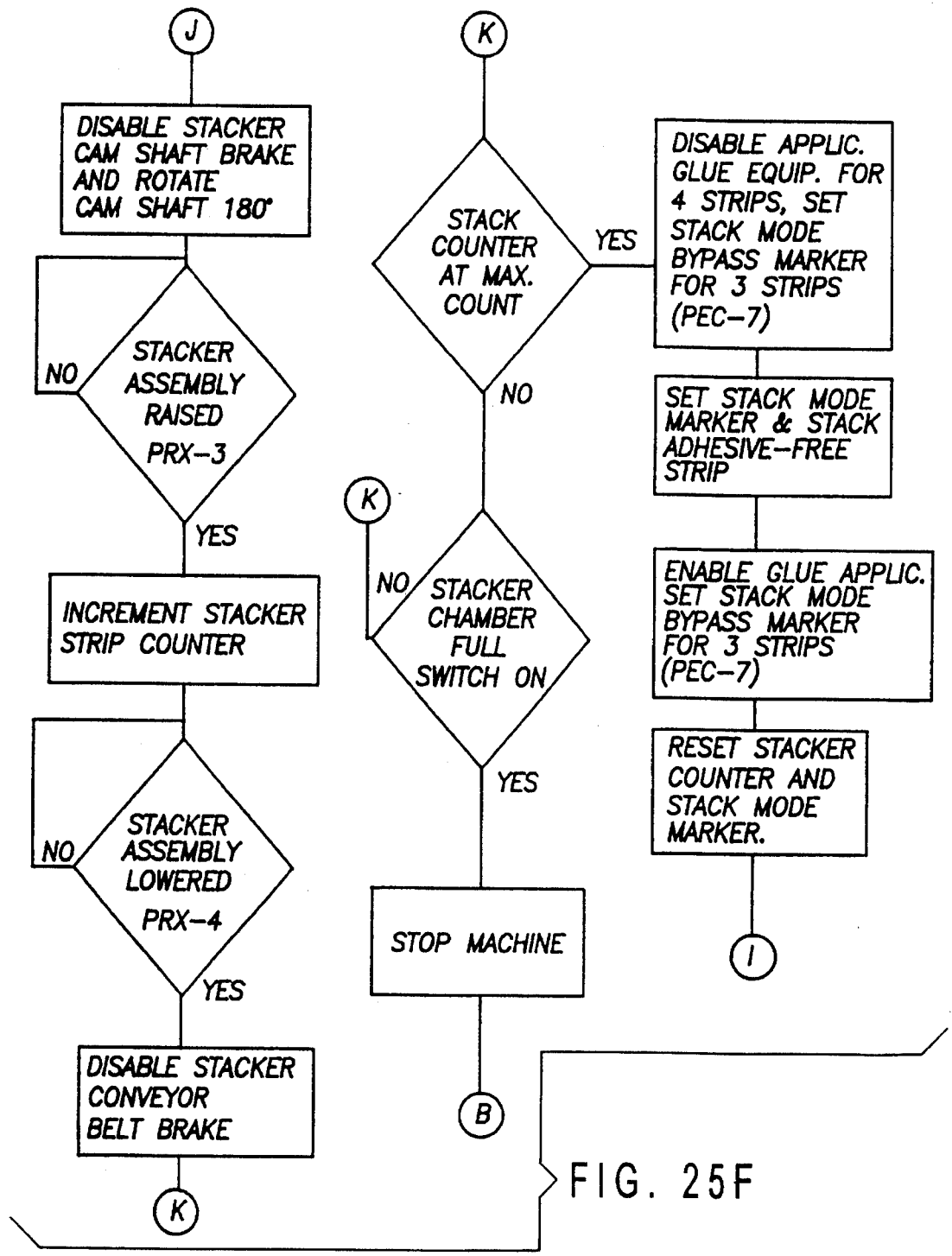
Figure 25G:
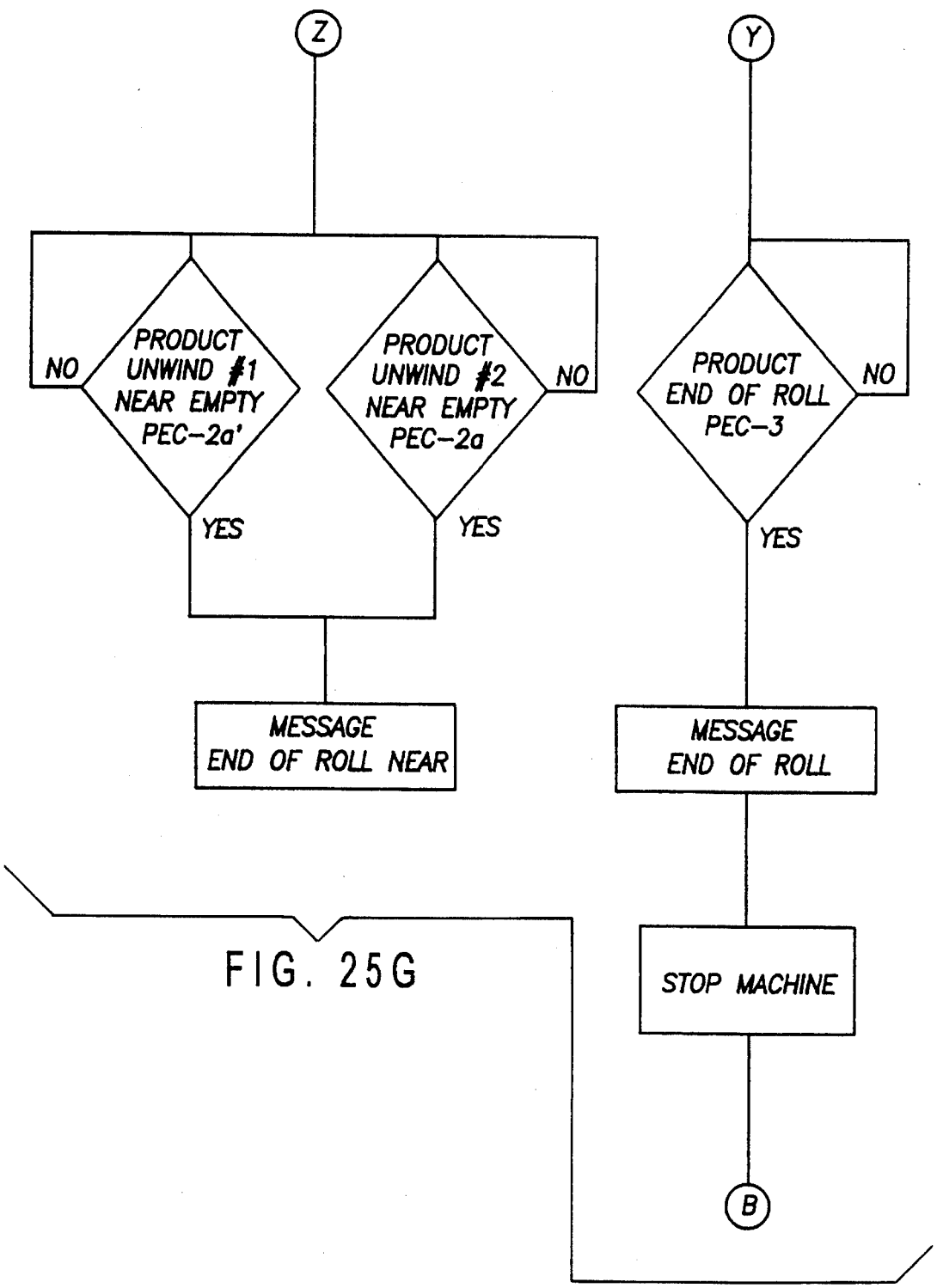
Figure 26:
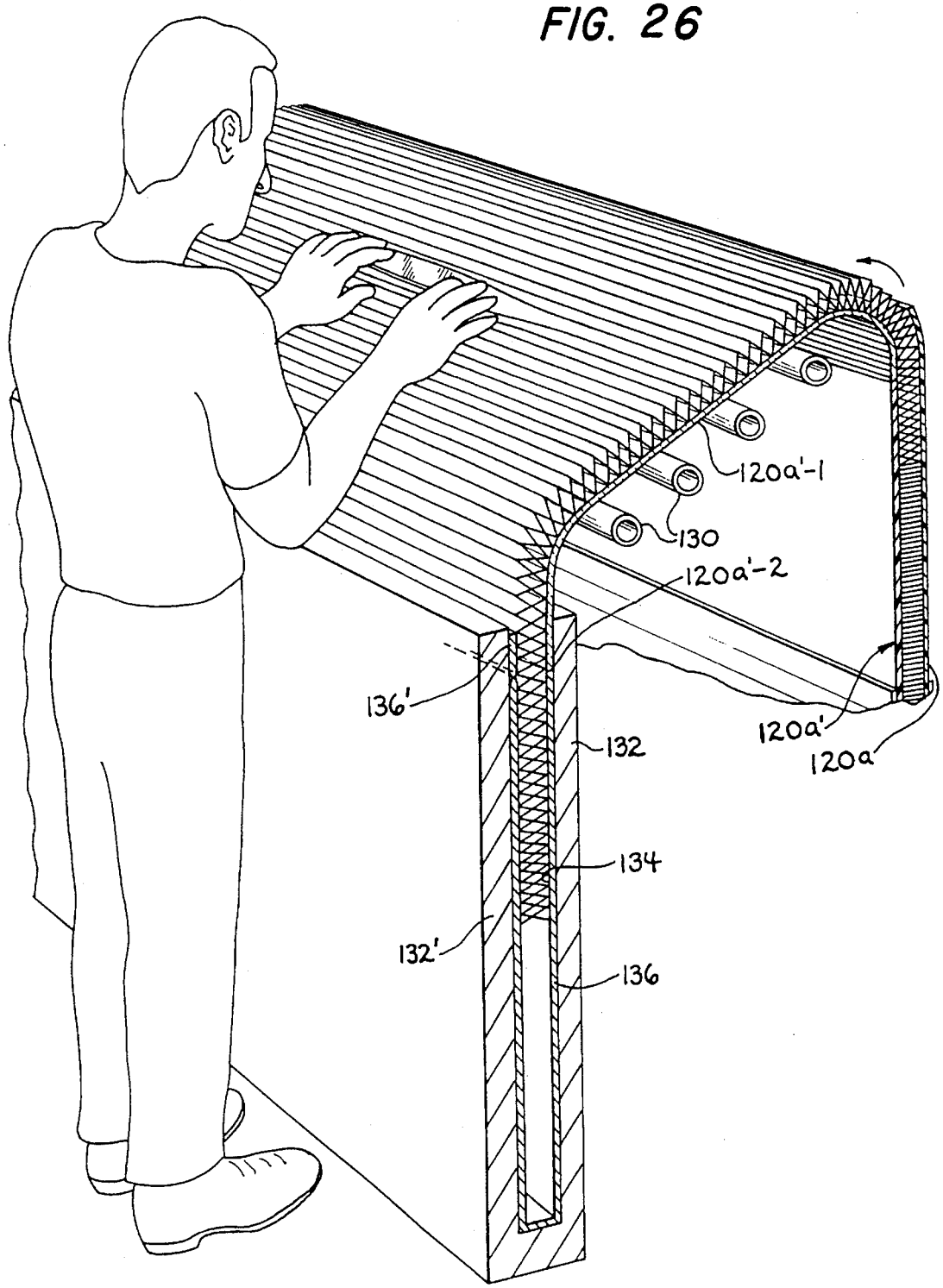
FIG. 26 is a perspective view of a modified stacking chamber and associated monitoring station constituting the most preferred form for the stacking station of the invention.

Modified Stacking Chamber Construction and Associated Quality Control and Box-Packing Station As previously indicated, in the preferred from of the invention, to maximize production efficiency and reliability, the stacking chamber station is modified in the manner illustrated in FIG. 26. As thereshown, the forward stacking chamber-forming wall 120' shown in FIG. 23 is replaced by a wall 120a' which extends first upward and then curves downwardly to form in a forwardly and downwardly inclining product quality monitoring wall portion 120a'-1. The inclined wall portion 120a'-1, in turn, terminates in a downwardly extending front wall portion 120a'-2. This modified wall 120a' is preferably made of a white translucent material. The inclined monitoring wall portion 120a'-1 forms a quality control translucent window behind which are mounted florescent lamps 130 which back-light the wall portion 120a'-1.

The rear stacking chamber-forming wall 120 is modified to form a wall 120a which extends upwardly and then curves slightly to the left to confront the beginning of the curved portion of wall 120a', to define an exit aperture of the stacking chamber which directs the stacked strips onto the inclined monitoring wall portion 120a'-1.

The downwardly extending wall portion 120a'-2 terminates along the front face of a rear vertical packing box-receiving wall 132. Confronting the wall 132 is a similar wall 132' which defines with the wall 132 an open-top packing box-receiving passageway 134. This passageway receives a narrow rectangular packing box 136 having a top flap 136' which when opened exposes an entryway into the box 136 which can hold, for example, as many as 600 unexpanded strips of material which is to constitute the product shipped to the honeycomb panel fabricator. The strips are automatically guided into the box 136 by the wall portion 120a'-2. The quality control station illustrated in FIG. 26 is useful both when separable stacks of strips or a single continuous stack of secured together strips are produced in the stacking chamber.

Honeycomb panel material from which the strips involved are made are fabricated with different surface coloration or other ornamentation. Certain colors and surface ornamentations sometimes come from the material supplier with substantial defects than strips which are uncolored or ornamented differently therefrom. Where a very small amount of defective material is expected to be produced in the stacking chamber, build up of separable stacks in the stacking chamber is preferred. However, if a substantial amount of defective material is anticipated, a continuous build up of secured together stacks is preferred, to enable the quality control person who examines the strip material passing over the inclined monetary wall portion 120a'-1 to cut out the defective strips or group of strips before they are directed into the box 136. This cut-out operation is preferably achieved by the operator without stopping the equipment. He would use a knife or other suitable cutting edge tool to severe the defective strips from the stack of strips involved.

Scope of Claims

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

We claim:

1. A method of producing one or more individual stacks of flat, expandable tubular strips forming an expandable honeycomb panel, each stack to comprise N secured-together such strips of a length L the method comprising the steps of:

providing a continuous flexible sheet of material;

forming a flat, expandable tubular web from said continuous flexible material from which said strips are to be cut, stacked and secured together, said web having a number of major sections along its length, each major section having a portion comprising N–1 to-be-stacked segments each having a length L, a first to be stacked segment of a length L preceding said N–1 segments, and a not-to-be stacked portion between first to-be stacked segment and said N–1 segments, said not-to-be stacked portion having a not-to-be stacked front margin, said N–1 to-be-stacked segments including a last segment having an end margin, and said first to be stacked segment having a first to-be-stacked front margin;

moving said web first to an adhesive-applying station having at least one adhesive applying unit which is adapted to discharge adhesive down upon the top of said web and which is to be turned on and off to initiate adhesive flow and adhesive flow interruption periods respectively;

turning said at least one adhesive applying unit on when the not-to-be stacked front margin of each major web section passes thereby so that the consistency of the adhesive reaches a desired level by the time said N–1 segments of each web section passes thereby;

initiating the turn-off of said at least one adhesive applying unit at a point in time so that it is turned off completely at least when the first to-be-stacked front margin of said first-to-be stacked segment of the web passes thereby and after the end margin of the last segment of said N–1 segments of the web passes thereby;

moving the adhesive coated web to a cutting station where the first to-be-stacked segment and N–1 to-be-stacked segments of the web are transversely and sequentially cut into N individual flat, expandable tubular cut strips each of a length L, and where the not-to-be stacked portions of the web are transversely and sequentially cut into at least a single not-to-be stacked strip;

delivering said strips cut from said first to-be-stacked segments and N–1 to-be-stacked segments of the web to a stacking station where the strips are stacked and pushed against each other to adhere the strips together forming an expandable honeycomb panel; and delivering the strips cut from said not-to-be-stacked portions of the web to a delivery point where these strips are not stacked.

2. A method of producing one or more individual stacks of flat, expandable tubular strips forming an expandable honeycomb panel, each stack to comprise N secured-together such strips of a length L, the method comprising the steps of:

providing a continuous flexible sheet of material;

forming a flat, expandable tubular web from which said strips are to be cut, stacked and secured together, said web having a number of major sections along its length, each major section having a portion comprising N–1 to-be-stacked segments each having a length L, a first-to-be-stacked segment of a length L preceding said N–1 segments, and a not-to-be-stacked portion preceding said first-to-be-stacked segment;

continuously moving said web first to an adhesive-applying station having at least one adhesive applying unit which discharges adhesive down upon the top of said web and which is to be turned on and off to initiate adhesive flow and adhesive flow interruption periods respectively;

initiating the turn off of said at least one adhesive applying unit when said not-to-be-stacked portion of each major web section passes thereby so that the unit is completely turned off when said first-to-be-stacked segment of each web section passes thereby and turning said at least one adhesive applying unit on at a point in time so that the adhesive flows with a desired consistency;

continuously moving the adhesive-coated web to a cutting station where the first to-be-stacked segment and the N–1 to-be-stacked segments of the web are transversely and sequentially cut into N individual flat, expandable tubular cut strips each of a length L, and where the not-to-be-stacked portions of the web are transversely and sequentially cut into at least a single not-to-be-stacked strip;

delivering said strips cut from said first to-be-stacked segments and N–1 to-be-stacked segments of the web to a stacking station where the strips are stacked and pushed against each other to stack and adhere the strips together forming an expandable honeycomb panel; and delivering the strips cut from said not-to-be-stacked portions of the web sequentially to a delivery point where these strips are not stacked.

* * * * *